United States Patent [19]

Schornack et al.

[11] Patent Number: 5,715,296
[45] Date of Patent: Feb. 3, 1998

[54] CONCURRENT WIRELESS/LANDLINE INTERFACE APPARATUS

[75] Inventors: Louis W. Schornack, Park Ridge; Carl T. Heitschel, Naperville; Nuri G. Anter, Westchester, all of Ill.; Neil Beneditz, St. Joseph, Mich.; Jay Kinder, McHenry, Ill.

[73] Assignee: Telular Corp., Vernon Hills, Ill.

[21] Appl. No.: 369,539

[22] Filed: Jan. 5, 1995

Related U.S. Application Data

[63] Continuation-in-part of Ser. No. 309,845, Sep. 20, 1994.
[51] Int. Cl.$^6$ .................. H04M 11/00; H04M 3/42; H04Q 7/00
[52] U.S. Cl. .................. 379/58; 379/59; 379/63; 455/33.1
[58] Field of Search .................. 379/58, 59, 61, 379/63, 210, 211, 212, 177, 185, 182, 184, 167, 171, 168; 455/33.1

[56] References Cited

U.S. PATENT DOCUMENTS

| | | | |
|---|---|---|---|
| 4,752,949 | 6/1988 | Steinbeck et al. | 379/61 |
| 4,878,243 | 10/1989 | Hashimoto | 379/210 X |
| 4,887,290 | 12/1989 | Dop et al. | 379/59 X |
| 4,890,315 | 12/1989 | Bendixen et al. | 379/63 X |
| 5,341,415 | 8/1994 | Baran | 379/201 |
| 5,390,233 | 2/1995 | Jensen et al. | 379/58 |
| 5,454,024 | 9/1995 | Lebowitz | 379/59 X |
| 5,517,547 | 5/1996 | Ladha et al. | 379/59 X |
| 5,526,403 | 6/1996 | Tam | 379/59 |
| 5,594,782 | 1/1997 | Zicker et al. | 379/61 X |

OTHER PUBLICATIONS

Harry Newton, Newton's Telecom Dictionary, Flatiron Publishing Inc., p.885, Jan. 1994.

"FreedomLink Strategy — One Number, One Handset, Multiple Location", Southwestern Bell Mobile Sustems, Nov. 15, 1994.

*Primary Examiner*—Dwayne Bost
*Assistant Examiner*—Scott Richardson
*Attorney, Agent, or Firm*—Milton S. Gerstein; Marvin N. Benn

[57] ABSTRACT

An apparatus for interfacing at least one land-line telephone service, at least one wireless cellular-type telephone service, at least one cellular-type wireless telephone and at least one standard telephonic type communication device through standard building interior telephone cable.

9 Claims, 23 Drawing Sheets

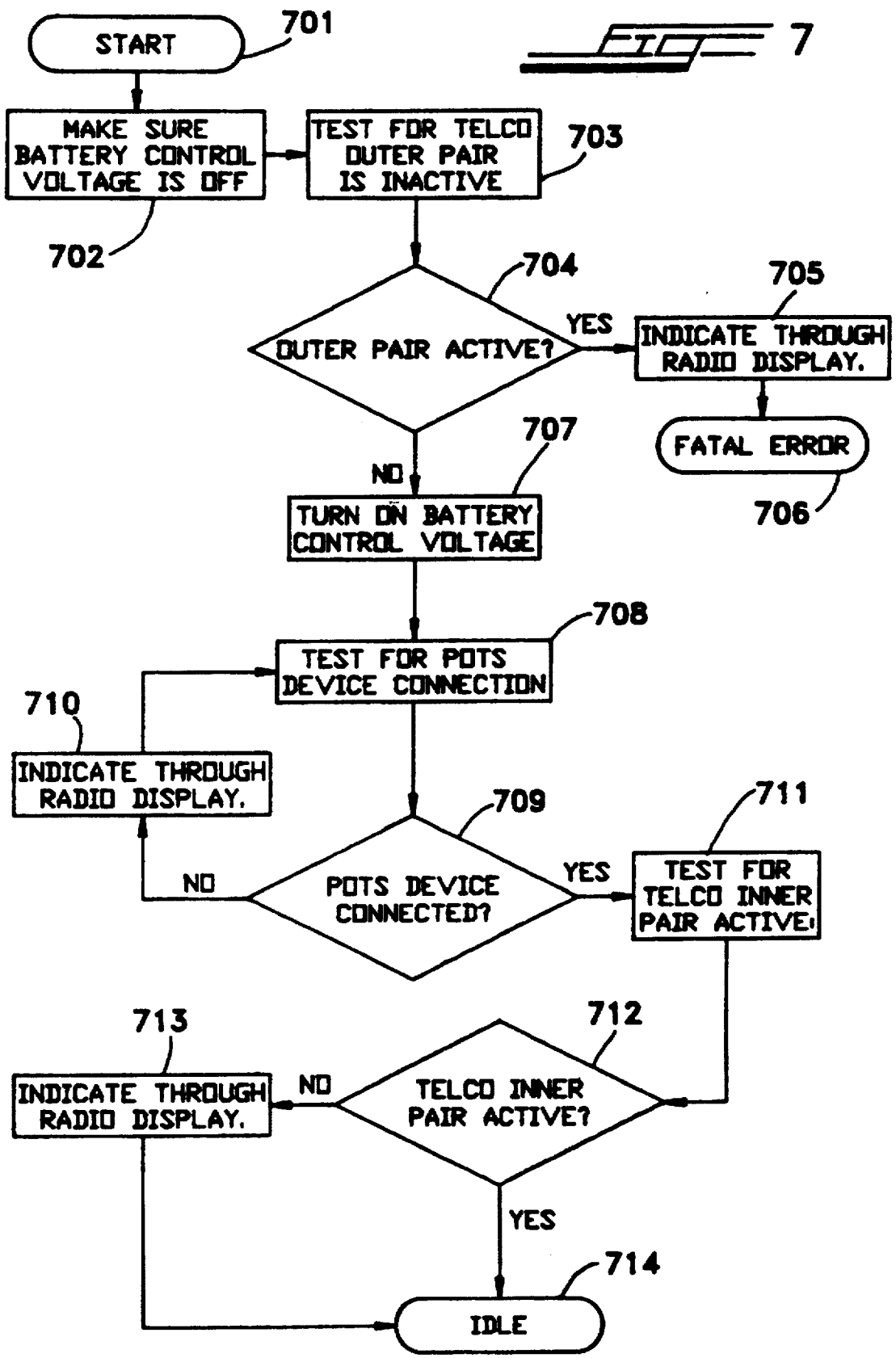

FIG. 10
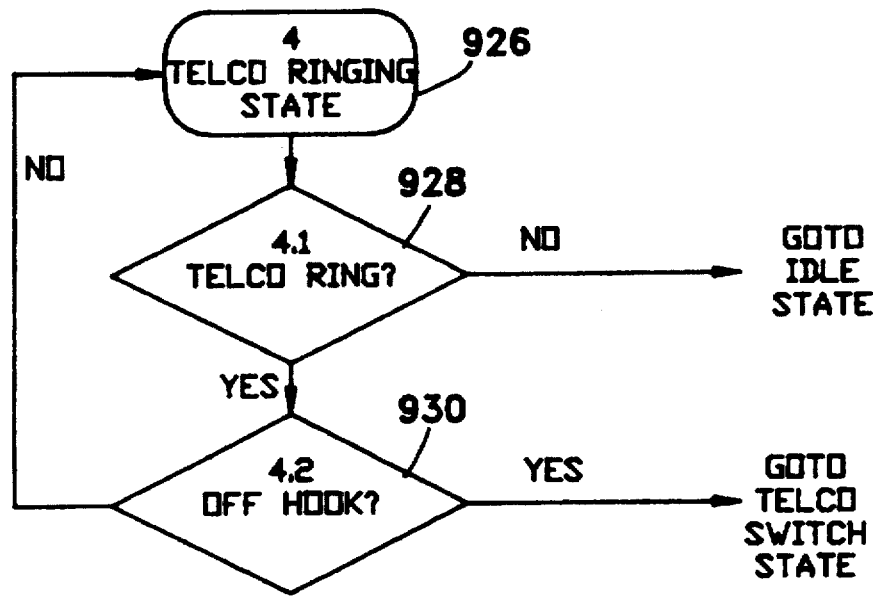
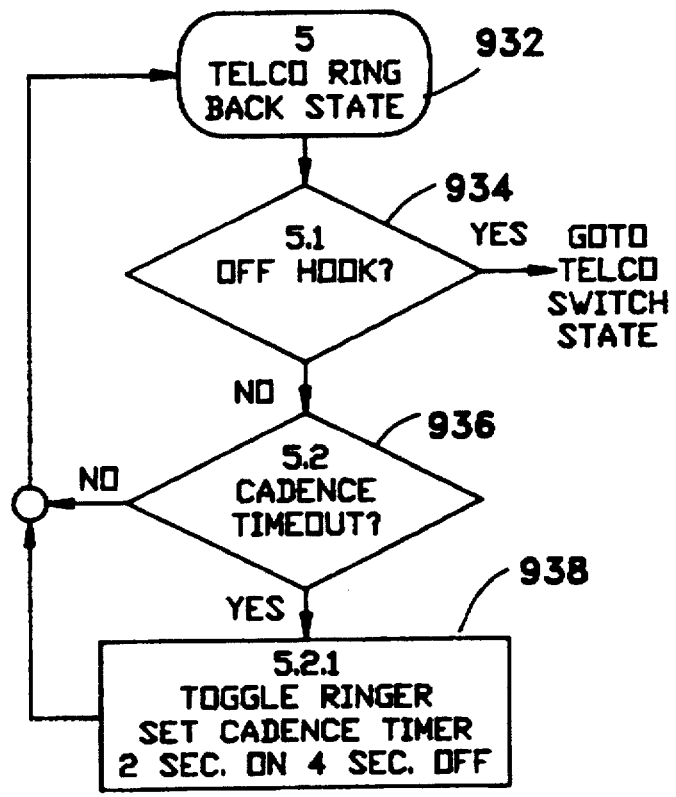

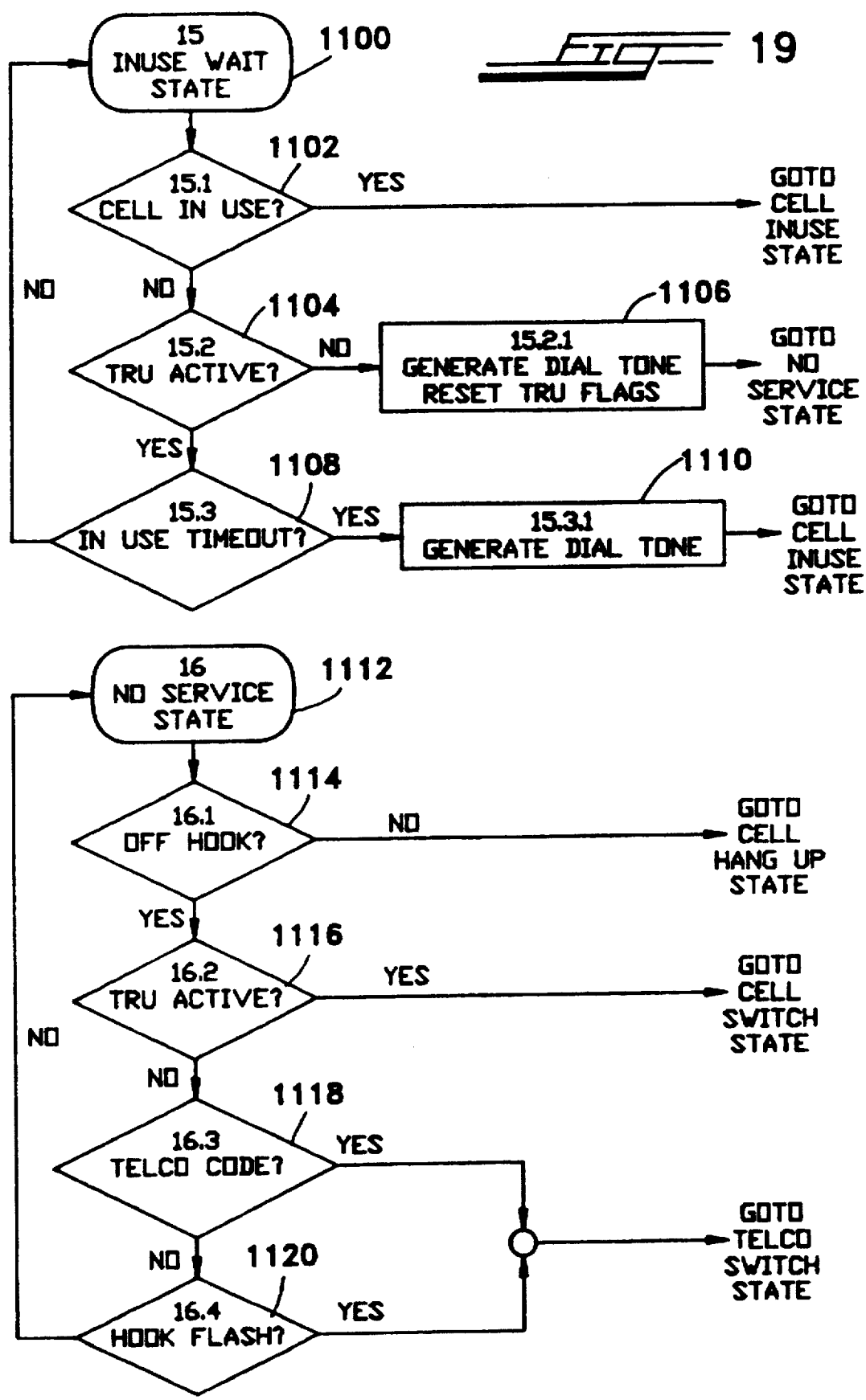

CONCURRENT WIRELESS/LANDLINE INTERFACE APPARATUS

CROSS REFERENCE TO RELATED APPLICATION

The present application is a continuation-in-part of application Ser. No. 08/309,845, filed on Sep. 20, 1994.

BACKGROUND OF THE INVENTION

The present invention relates to a system which integrates a standard, telephone-type communication device, a cellular-type wireless service, a cellular interface system such as described in U.S. Pat. No. 4,658,096, issued Apr. 14, 1987 to West et al., existing telephone wiring installed within a building, and a telephone company wireline service. In particular, the standard, telephone-type communication device, when connected to the invention, is capable of selectively both receiving and initiating calls over the cellular-type wireless service, as well as also both receiving and initiating calls over the telephone company land-line service.

Known cellular interface products, such as the Telular Phonecell™, PCS$^{one}$™, of Telular Corporation Buffalo Grove, Ill., and competing products from other companies, had difficulty in being connected to one or more telephone extensions located in other areas of a building remote from the interface. The Telular PCS$^{one}$™ System shown pictorially in FIG. 1, is a combination charging circuit and docking station for hand-held cellular transceivers, such as the Motorola MICRO-TAC™ transceiver which allows the coupling of a standard telephone-type communicatione device, such as a facsimile, modem, plain old telephone (POT) or any other device that would normally be coupled to a standard telephone wall jack. Connection of more than one telephone extension at separate locations within the building disadvantageously required that separate wiring be installed in the building, or required a trained installer to rewire the existing, installed telephone wiring of a building, often with unsatisfactory results. After this installation or rewiring effort, two, single-line, standard telephones were necessary to access both the telephone company and cellular-type service (cellular). A two-line telephone would be required if a single instrument would be used to access both the telephone company (telco) wireline service as well as the cellular interface line. When an incoming or outgoing call would occur, there was often confusion as to whether the telco service or the cellular service was being accessed.

In addition, with the known cellular interface, a consumer often made a mistake in the installation of this type of product by not reading the manual and incorrectly plugging the cellular interface directly into the telco service line. This was in violation of Federal Communications Commission (FCC) Part 68 rules and invited possible damage to the cellular interface and to the telco equipment. Known cellular interfaces were difficult to be installed by individuals possessing no technical knowledge of electricity or of the telephone system. Each building is different as to whether it has telco line 1 wiring installed, telco line 2 wiring installed, wiring shorts between wires on telco line 1 or line 2, an active Telco line 1, or an active Telco line 2. Because of all these variables, there was difficulty for the consumer to effectively and consistently be able to properly install a known cellular interface in a dwelling without a large number of consumer problems, and perhaps significant numbers of damaged cellular interface devices. Prior art interfaces lacked adaptive intelligence and system diagnostics to sense the unique environment into which it was installed and properly react to it. Although prior-art cellular interfaces allowed a standard telephone-type communication device to be connected to cellular service, prior art interfaces disadvantageously did not allow a standard telephonic type communication device to be selectively switched between wireline and cellular service. Prior-art interfaces had no provision for connection to a wireline telephone company service.

This invention is directed at solving these and other disadvantages of the prior art.

SUMMARY OF THE INVENTION

An object of the invention is to allow a facility, normally wired for a single telephone line from the wireline telephone company, to become a two-line facility, with the second line coupled to a wireless communication system and remain fully compatible with all FCC Part 68 devices, including standard telephones, (both, single and double line), facsimile devices, alarm systems and modems.

Another object of the invention is to allow a consumer without any tools or knowledge of a telephone system to use the invention by easily allowing him to use his standard house telephone wiring and add a cellular communication capability as an additional line to his current system without improperly coupling an active device to a landline telephone outlet.

Accordingly, in accordance with an illustrative embodiment of the present invention, there is provided a telephonic communication system having at least one communication device for interconnection with a telephone network via at least two communication media, the improvement comprising means for coupling the at least one communication device with the at least two communication media, and means for individually determining the availability of each of the at least two communication media, and means responsive to the determining means connected to the coupling means for automatically interconnecting the at least one communication device with the telephone network via the available one of the communication media.

In accordance with another illustrative embodiment of present invention, there is provided a communication system having first and second communication paths and at least one telephonic type communication device, the system being coupled to at least two communication networks for providing a first and second means of communication, the first means of communication coupled to the first communication path, and the communication system having at least one means for coupling the at least one telephonic communication type device to the first communication path, the improvement being means between the at least one telephonic type communication device and the coupling means for connecting the telephonic type communication device to the second communication path, and switching means coupled to the second communication path and to the first and second means of communication for selectively coupling the second communication path to one of the first and second means of communication.

In accordance with yet another illustrative embodiment of the present invention, there is provided a communication system having a communication path and at least one telephonic type communication device, the communication system being coupled to a communication network for providing a means of communication, and the communication system having at least one telephonic communication type device coupled to the communication path, the improvement being testing means coupled to the communication path for testing the presence of any signal thereon, and interface means coupled to the communication path and the testing means and being responsive to the testing means for coupling the communication path to the communication network.

In accordance with still another illustrative embodiment of the present invention, there is provided a communication system comprising a cellular type interface coupled between a cellular-type transceiver and a six-position wall jack coupling means with at least four positions having individual conductors coupled thereto, a telephonic type device coupled to at least two of the individual conductors, and means coupled between the telephonic type device and the six-position telephone jack coupling means for inverting the position of at least two of the individual conductors to the position of two of the other individual conductors.

BRIEF DESCRIPTION OF THE DRAWINGS

FIG. 7 is a flow chart showing the operation of the invention including the testing of the wireline telephone company's lines during initialization;

FIGS. 9–19 are flow charts for the state diagram of FIG. 8 showing the flow of events of the invention.

DETAILED DESCRIPTION OF PREFERRED EMBODIMENT

Figure 1:
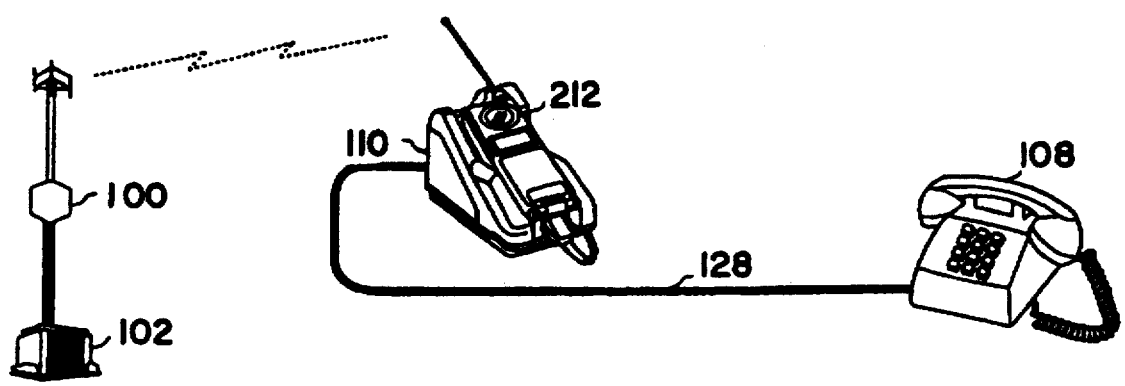
FIG. 1 is a pictorial diagram of a prior-art cellular interface connected to a standard telephonic type communication device.
Figure 2:
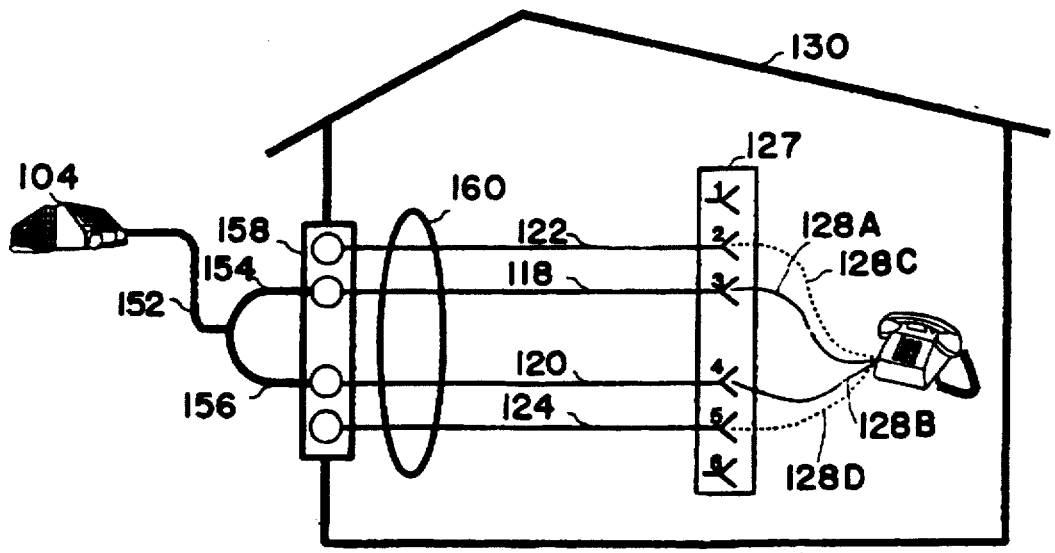
FIG. 2 is a simplified pictorial, prior-art diagram of a wireline, telephone company central office, a customer's building having four conductor wirelines, telephone-company cabling installed therein, and a single-line telephonic type communication device connected to two of the four conductors
Figure 3:
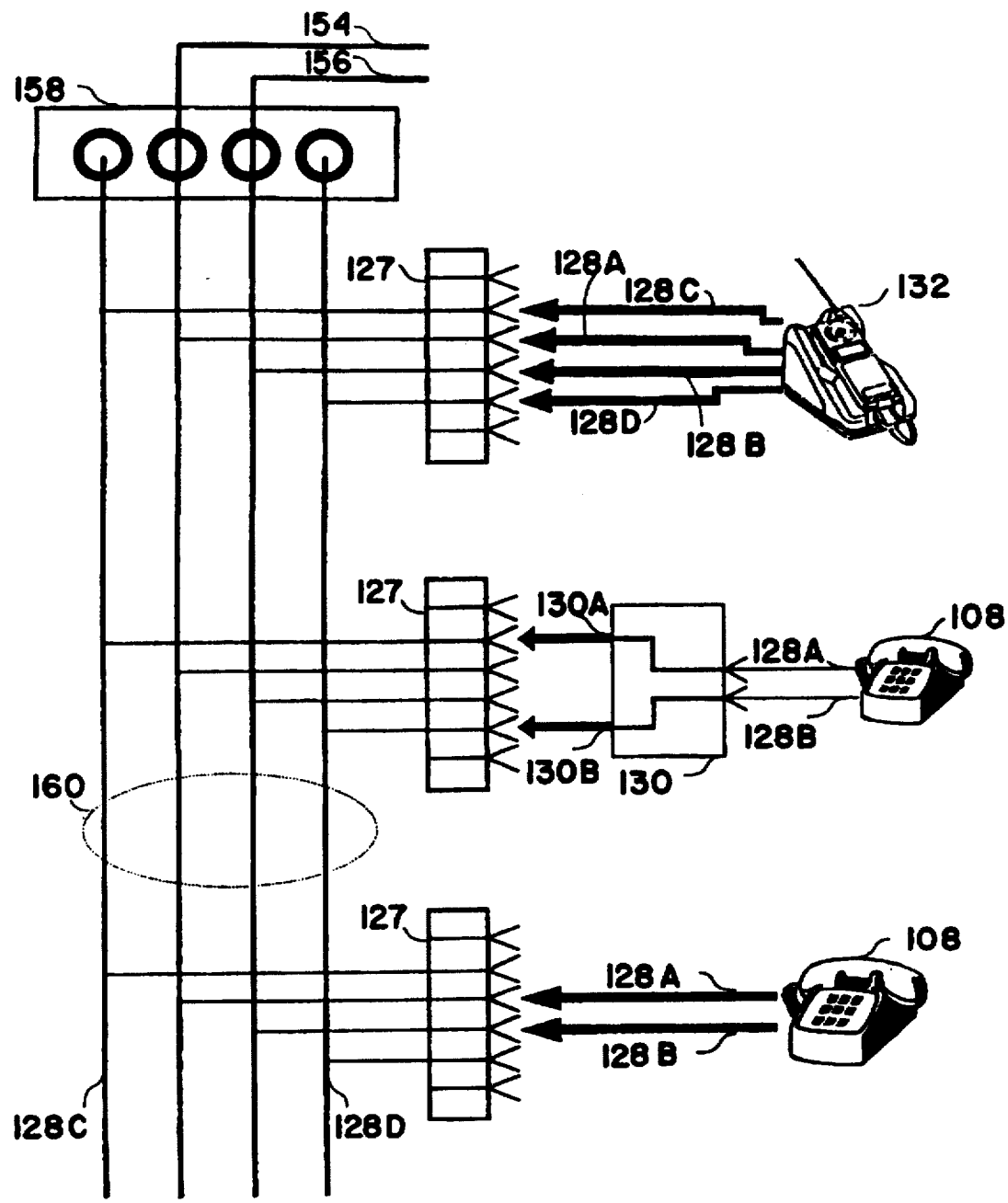
FIG. 3 is a simplified diagram showing the connection of the invention and of two standard telephonic type communication devices.

Referring to FIG. 2, a building 130 has been wired with a four-conductor cable 160 for distributing a wireline telephone company service to a location within the building. The location has a six-position telephone jack terminating the wireline telephone company service. FIG. 2 shows only one six position telephone jack 127 at only one location for simplicity; however, the building 130 has a plurality of locations, each position having a six-position telephone jack 127, such as an RJ-11 jack for wireline telephone service termination. The service from the wireline telephone company central office 104 is via a two-conductor cable 152 having a tip 154 and a ring 156 conductor. Referring to FIG. 3, the tip 154 and ring 156 conductors from the central office 104 are connected to a service entrance terminal block 158. The four-conductor cable 160 of the building 130 is connected to the terminal block 158. As seen in FIG. 2, two conductors 118 and 120 (usually with red and green wire insulation) of the four conductors of the building cable are connected to the tip 154 and ring 156 conductors from the central office 104. The other two conductors 122 and 124 (usually with black and yellow wire insulation), although connected to the service entrance terminal block 158, are not used for communication with the central office 104 if the building has only single telephone line service, such as a typical single family residential dwelling. In addition to being connected to the service entrance terminal block 158, the yellow 124 and black 122 wires are also connected to a "line 2" position of the 6 position telephone jack 127 at each termination of wireline telephone service within the building 130. Therefore, the black 122 and yellow 124 conductors (i.e. line 2) of the building telephone cable 160 are available for interconnection between system of the invention and a plurality of standard telephonic type communication devices, each device normally capable of being coupled to a telco line (hereinafter "telephonic device"). The system of the invention is simultaneously connected to both wireline and cellular services, as explained hereinbelow. The system of the invention is housed in a docking station similar to the PCS$^{one-}$ presently being manufactured by Telular Corporation.

Referring now to FIG. 3, the installation of the invention starts by directly plugging the invention into an available, typically wall mounted, six position telephone jack 127. The power supply is connected to the system, and the power plug of the power supply is plugged into an available power out-let. All pre-installed single line telephone devices are unplugged from the wall telephone jacks, a line inversion adapter 130 is inserted into the telephone jack 127, and each single telco line telephone device 108 is plugged into the line inversion adapter 130 or conversely, one or more telephone devices can also be left as pre-installed, as shown in FIG. 3. Single line standard telephonic type communication devices are designed to be plugged into the "line 1" position of six position telephone jacks. The line inversion adapter causes the device to be connected to "line 2" of the telephone jack. A telephone device 108 which is dedicated the telco line does not use the inversion adapter 130 at the wall telephone jack 127. The inverter 130 ensures that the telephone set is connected to the outer tip and ring terminals, or line 2 of the RJ-11 jack.

Upon being installed, the system of the invention will initially perform a set of system diagnostics to determine if there are any problems with the installation environment. Determination of the electrical environment includes but is not limited to: sensing if the unit telephone receptacle is connected to the external wiring; sensing if the external wiring has a functioning connection to a central office on Line 1; sensing if the external wiring has a functioning connection to a central office on Line 2; and sensing whether standard telephone devices are connected to Line 2. System installation problems are displayed as codes on a display of a portable cellular telephone placed in the docking station of the housing. Interpretation of these error codes is in a user's manual.

Upon performing an installation successfully, calls can be received and placed on both the telco land-line service and cellular service. Placing an outgoing call is accomplished normally by picking up the telephone receiver and dialing. The invention has different sets of criteria which can be used to determine whether it will default to the telco service or to cellular service, as detailed hereinbelow. The criteria will vary depending on how the unit is marketed and the service/customer which the unit is expected to serve. For example, an internal electronic clock/calendar allows the defaulting to depend upon the time of day and day of week in order to take advantage of differing telephone rates. When a receiver of a telephone device is taken off hook with the invention set to default to the telco service, and if the user wants to place a call on the cellular service, the user enters the cell code, preferably C. The invention then switches the telephone from the telco land line to the cellular line. An outgoing call is then placed normally over the cellular service. If the unit defaults to the cellular service and the user wishes to place a call on the telco service, the user enters the telco code, preferably T. The call is then placed normally over the land line service.

An incoming call on the telco land line rings normally, and is answered by just picking up the receiver. An incoming call on the cellular line has a slightly different ring characteristic (preferably it is two bursts during the two second ring period followed by a four second off time). Because the telephone rings with these two different characteristics, the person answering the call can tell in advance which line is ringing. If a call is received on the telco land line, and is answered, and shortly thereafter a call is received on the cellular line, a call waiting beep is heard in the telephone receiver. If the person using the telephone performs a hook flash on the switch-hook of the telephone instrument, or, alternatively the user enters a predetemined digit-code pattern on the telephone instrument, the telco line is placed on hold by the invention and the cellular line is connected to the telephone instrument. If a hook flash is again performed on the switch-hook of the telephone, or, alternatively the user enters a predetermined digit-code pattern on the telephone instrument, the telco land line is reconnected and the cellular line is placed on hold. The same sequence of events applies if the initial call is received on the cellular line instead of the telco land line. If a call is in progress on the cellular line and a telco land-line call is being received (as evidenced by the telco line ringing) a beep is heard through the telephone receiver. A hook flash, or alternatively the user enters a predetermined digit-code pattern on the telephone instrument, he puts the cell line on hold and connects to the telco land line. The portion of the operation of the invention not fully disclosed herein is described in the aforesaid U.S. Patent to West et al., which is hereby incorporated by reference. The following table summarizes the possible events that will occur using the system of the invention.

TABLE 1

| Event Name | General Description. |
| --- | --- |
| Off Hook | Receiver of POTS device has been taken off the hook. |
| Hang Up | Receiver of POTS device has been placed on the hook. |
| DialTone | Dial tone has been detected on the telco line. |
| No Dial Tone | No dial tone has been detected on the telco line. |
| Telco Ring | Detected the POTS device ringing from incoming telco call. |
| No Telco Ring | POTS device stopped ringing from incoming telco call. |
| Cel Alert | Incoming call from the cellular radio. |
| Digit Entry | Digits entered from the POTS device. |
| Dial Complete | Outgoing caller has completed dialing. |
| Cel Code | Sequence of digits (**C) to switch from telco line to cel line. |
| Telco Code | Sequence of digits (**T) to switch from cel line to telco line. |
| Lost Telco | The telco line has lost its connection. |
| Hook Flash | Momentary pressing (hang up) of POTS device receiver hook. |

TABLE 1-continued

| Event Name | General Description. |
| --- | --- |
| Cel Not Inuse | The called party on the cellular line has hung up. |

The Off Hook event as described in Table 1 is detected by monitoring loop current on either the telco land line or the cellular line depending on which is switched in. (The cellular line is normally switched in.) This is done by software stored in Read Only Memory (ROM) internal to a microprocessor detecting an active low signal on the Telco LC (U3 port P3.0—FIG. 6A) when on a telco line, or Cel LC (U3 port P3.5) when on a cellular line. The software does not recognize an off-hook event unless loop current had been absent (on hook) for more than 700 msec and then loop current became present for at least 500 msec. The software switches the system from the cellular line to the telco line through hardware (U3 port P.1), where cellular line is active high, and telco line is active low.

The Hang Up event as described in Table 1 is detected by monitoring loop current on either the telco line or the cellular line depending on which is switched in. This is done by software detecting an active low signal on the Telco LC (U3 port P3.0—FIG. 6A) when on telco line, or Cel LC (U3 port P3.5) when on cellular line. Software does not recognize a Hang Up event unless loop current had been present (off hook) for more than 500 msec and then an absence of loop current occurred for at least 700 msec.

Figure 6A:
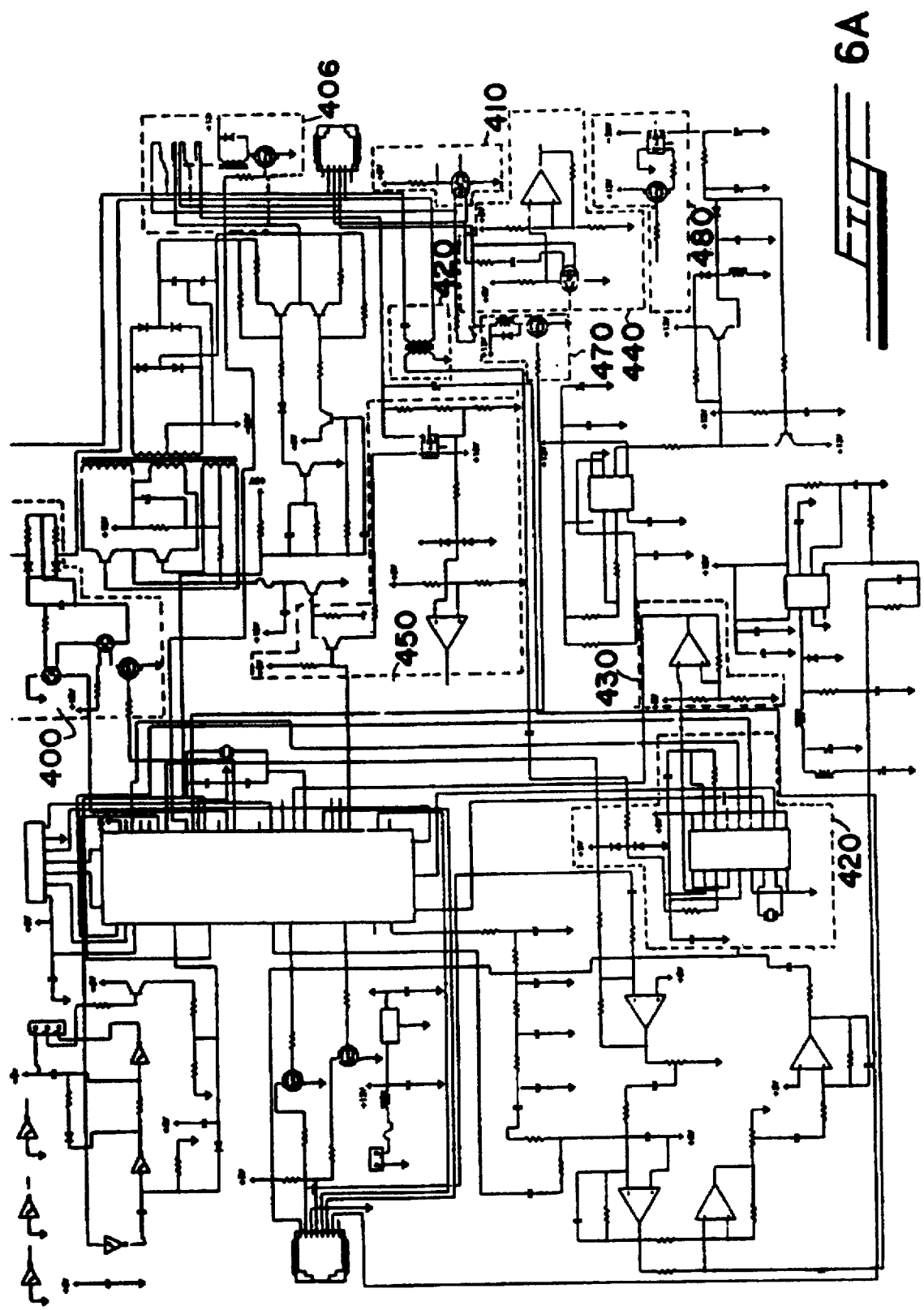
FIG. 6A is a detailed schematic diagram of the invention.

The Dial Tone event as described in Table 1 is detected by software monitoring the hardware dial tone input at U3, port P3.7 (FIG. 6A). Software must look for a sequence of transitions on this port that represent a pattern created by a superimposed 350 Hz with 440 Hz signal produced by zero crossing detection. Software does not recognize the Dial Tone Event unless this signal is present for at least 500 msec while the Off hook condition is true and connected to the telco line (active low asserted on U3, port P2.1.).

The No Dial Tone event as described in Table 1 is detected by software monitoring the hardware dial tone input at U3 port P3.7 (FIG. 6A). Software must look for a sequence of transitions on this port that represent a pattern created by a super imposed 350 Hz with 440 Hz signal. Software does not recognize the No Dial Tone Event unless there is an absence of this signal for at least one second while the Off hook condition is true and connected to the telco line.

The Telco Ring event as described in Table 1 is detected by software monitoring the hardware signal input at U3 port P3.4 (FIG. 6A). Software recognizes the Telco Ring Event by transitions on this port produced by the ring signal (between 15 and 65 Hz) for at least 100 msec.

The No Telco Ring event as described in Table 1 is detected by software monitoring the hardware signal input at U3 port P3.4 (FIG. 6A). Software does not recognize the No Telco Ring event, unless the Telco Ring event has first been detected. When the Telco Ring event is detected, the No Telco Ring event may be detected by the absence of the ring signal at U3 port P3.4 for at least 5 seconds.

The Cel Alert event as described in Table 1 is detected by software receiving a cell alert message from the cellular telephone via serial transmission. The Cel Alert, the Digit Entry event, and the Dial Complete event are well known in the prior art.

The Cel Code event as described in Table 1 is detected by software recognizing a sequence "**C" dialed.

The Telco Code event as described in Table 1 is detected by software recognizing a sequence "**T" dialed.

The Lost Telco event as described in Table 1 is detected by the software of the invention. The soft-ware recognizes a telco connection by asserting an active high on the hardware telco hold line through U3, port P2.0 and checking that telco loop current is present (active low on input U3, port P3.0). If telco loop current is not present after software asserts an active hold, then software detects the Lost Telco condition.

The Hook Flash event as described in Table 1 is detected by monitoring loop current on either the telco line or the cellular line depending on which is switched in. This is done by software detecting an active low signal on the Telco LC (U3 port P3.0) when on the telco line, or Cel LC (U3 port P3.5) when on cellular line. Software does not recognizes the Hook Flash event unless loop current had been present (off hook) for more than 500 msec and then an absence of loop current occurred for at least 200 msec, but no more than 700 msec.

The Cel Not Inuse event as described in Table 1 is detected by software receiving the message from the cellular radio via serial transmission and is well know in prior art.

Figure 4:
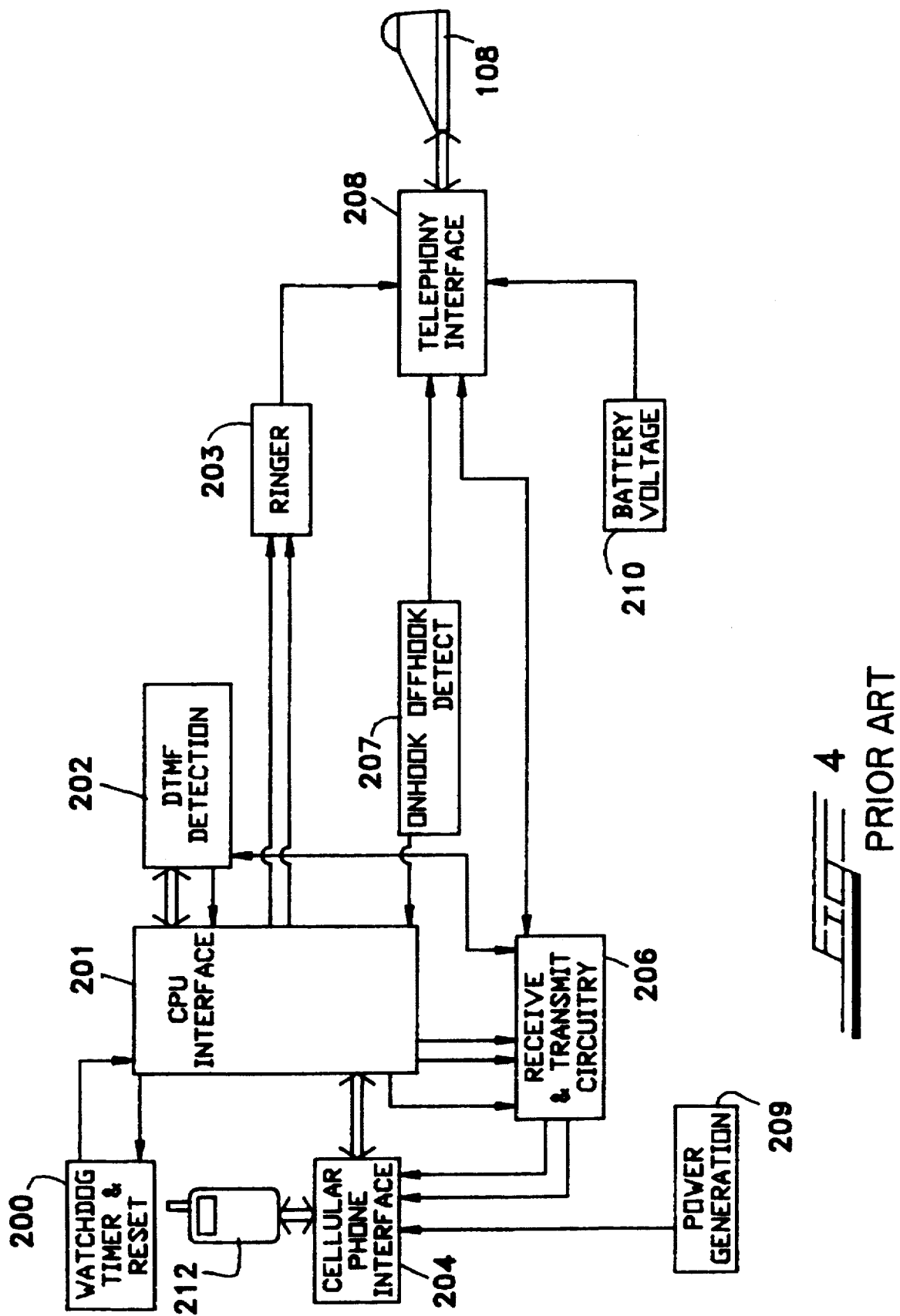
FIG. 4 is a block diagram of a prior-art cellular interface.

The system shown in FIG. 4 is a conventional, prior-art interface for interfacing a cellular telephone 212 to a telephonic device 108, allowing the telephonic device 108 to access communications via the cellular telephone 212. The present invention utilizes this prior-art system, and, therefore, a description thereof would be beneficial for a complete understanding of the system of the invention. The prior-art system of FIG. 4 connects a standard telephone device 108 to the cellular telephone 212 via a cellular telephone interface 204. The cellular telephone interface 204 is the actual physical connection which interfaces the cellular telephone 212 to the telephone device 108, via the telco line interface 208. All the necessary information and power to the cellular telephone is received and/or supplied through the cellular telephone interface 204. Once power is applied, communication is established between the cellular telephone 212 and the CPU interface 201. It uses a microprocessor, preferably an Intel 8051 type, to perform all its operations, such as initializing the cellular telephone 212, setting all of the control signals (I/O s) to their initial states for a ringer circuit 203, and a receive and transmit circuit 206. The software is written in 8051 assembly language. All functions of the unit is controlled by CPU interface 201. The CPU interface 201 communicates with the cellular telephone 212 via cellular interface 204 and controls the necessary hardware on board. This initializing is started by the Watchdog Timer & Reset circuit 200 which is the circuit that jump-starts the operation of all the intelligence embedded into the system, and it will restart the operation of all the intelligence if it detects an improper state of the external hardware and/or internal timing sequences. During initialization, the CPU interface 201 sets all the necessary I/Os of the microprocessor to their default conditions required by the external hardware to function properly. The telephone interface 208 is preferably an FCC part 68 compatible RJ-11. At this point, if the telephonic device 108 connected to the telephone interface 208 were to be taken offhook, a precision standard dial tone would be received by the telephonic device 108. If a call were to be made using the telephonic device 108, the following would take place:

When telephonic device 108 connected at telephone interface 208 comes offhook, a battery voltage circuit 210 provides the necessary power required to operate the telephonic device 108. Since the telephonic device 108 receives power, its offhook state will be detected by an onhook & offhook detect circuit 207. It detects the Onhook/Offhook condition of the telephonic device 108. This circuit also allows the CPU interface 201 to evaluate pulse dialing activity. Onhook/offhook detect circuit 207 will report this condition of the telephonic device 108 to the CPU interface 201. Once CPU interface 201 acknowledges the offhook condition, it will generate a precision dial tone and inject it to receive and transmit circuitry 206. This interfaces the receive and transmit signals from the telephonic device 108 to the receive and transmit circuitry of the cellular telephone 212 in order to notify the telephonic device 108 that it can initiate dialing activity. Upon reception of dial tone, digits can be dialed in two different formats: First, DTMF (dual tone-multiple frequency) commonly known as touch-tone dialing, in which case the tones will be inputted to a DTMF detection circuit 202 via the receive and transmit circuit 206. The DTMF detection circuit will evaluate the digits dialed and determine their values, and relay this information to the CPU interface 201. The second method, pulse dialing, which is an older method of dialing activity, will be detected by the onhook & offhook detect circuitry 207. The digit information will then be relayed to the CPU interface 201. The CPU interface 201 will take the digit signals received and will convert them into serial digital information that could be understood by the cellular telephone 212. Once converted, the information will be relayed to the cellular telephone 212 with the appropriate command, which will allow the cellular telephone 212 to access the cellular service provider through cell site 100 in order to establish a communications link with the called party. When the called party answers the call, a communications path will be established. The data or voice information between the telephonic device and the called party will be relayed by the receive and transmit audio circuit 206. This established link can be terminated two ways: First, the called party can hang up. This is usually referred to as the remote hang up. In this case the cell site 100 will notify the cellular telephone 212, and the cellular telephone will relay the information to the CPU interface 201. Upon receiving this information the CPU interface 201 will simply set all the external circuitry as if a hang up occurred at the local telephonic device 108. The second way is when the calling party hangs up. This is usually referred to as the local hang up. In this case, the CPU unit 201 is informed by the onhook & offhook detection circuit 207 that the telephonic device 108 has been hung up. The CPU interface 201 will, in turn, relay this message by sending an appropriate "end of call" message that is valid for the particular cellular telephone 212.

If a call were to be received by the cellular telephone interface unit of FIG. 4, the following would take place. The cellular telephone 212 would be notified by the cell site 100 that it is being paged by the cellular communication system. This message will be relayed to the CPU interface 201, which, in turn, will activate the ringer circuit 203. Once the CPU informs this circuit that there is an incoming call, the unit will ring telephonic device 108 connected to the telephonic interface 208. This ringer signal is then injected to the telephonic device 108 via telephonic interface 208. The telephonic device 108 will ring, and the user would have to take the telephonic device 108 offhook. Upon noticing that the telephonic device 108 has been taken offhook, the onhook & offhook detect circuit 207 will notify the CPU interface 201, which then will send the appropriate call answer message for the communication device in use, thereby enabling a communications link with the calling party.

A power generation circuit 209 supplies the necessary power for the cellular telephone 212 to function. The power from the power generation circuit 209 is relayed to the cellular telephone 212 via cellular telephone interface 204.

Figure 5:
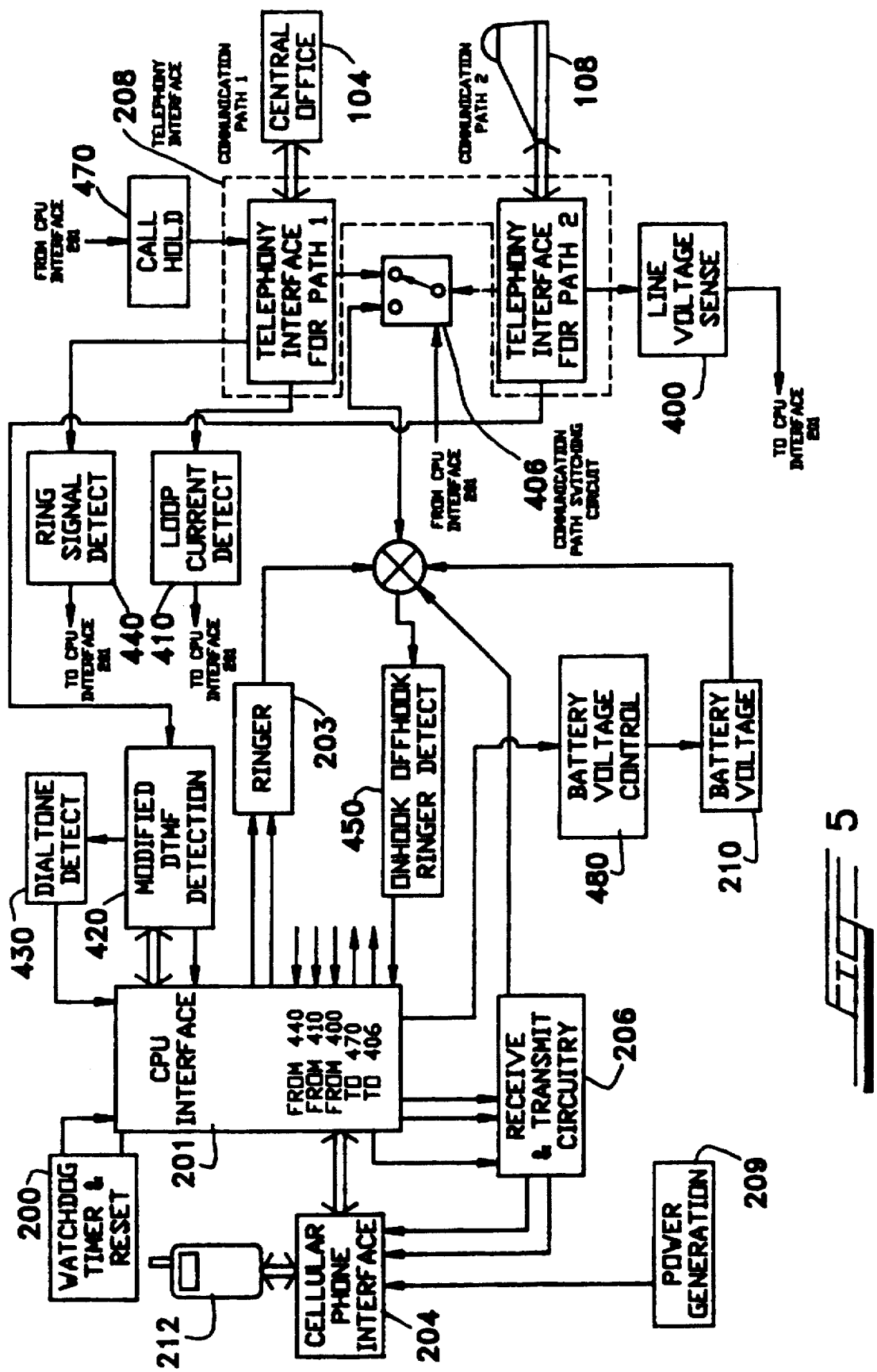
FIG. 5 is a block diagram of the invention.

FIG. 5 is a block diagram of the system of the invention, which incorporates therein the prior-art system of FIG. 4. Those elements of FIG. 4 that are incorporated into the system of the present invention are indicated with the same reference numerals as those shown in FIG. 4. The new elements unique to the present invention are now described.

Figure 6B:
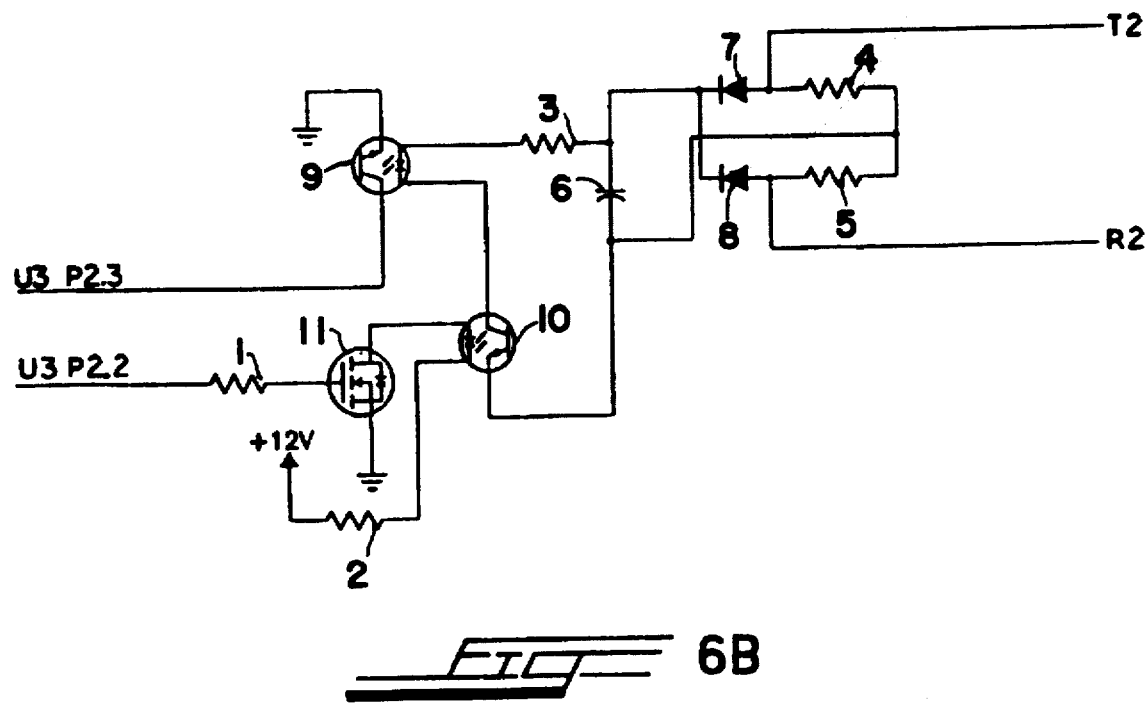
FIGS. 6B–6J are detailed schematic diagrams of portions of FIG. 6A corresponding to blocks of FIG. 5.
Figure 6C:
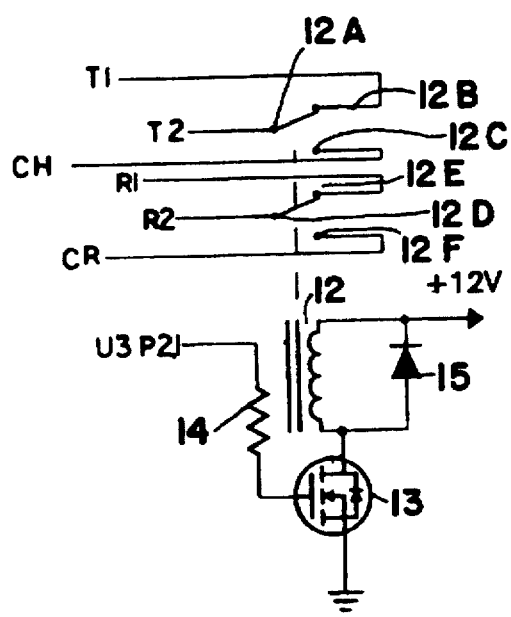

The system of the invention shown in FIG. 5 includes a Voltage Detect Circuit 400, which is shown in detail in FIG. 6B. This circuit detects unwanted DC voltages on communication path 2, namely the cellular path, prior to connecting the interface circuit to the path. The voltage detect circuit 400 detects unwanted DC voltages by placing a capacitance across the tip and ring of communication path 2. To determine if an unwanted voltage is present, the capacitance is allowed to charge from the unwanted voltage and subsequently discharge, on command from the microprocessor 201 (U3 in FIG. 6A), through a optically isolated sensing network. The sensing network develops a logic signal input to 201 indicating the presence or absence of voltage. Referring now to FIG. 6B, the circuit consists of resistors 1–5, diodes 7 and 8, capacitor 6, transistor 11, and opto-isolators 9 and 10. The function is as follows: The tip 128-C and ring 128-D of communication path 2 are connected to inputs T2 and R2 of the circuit 400 shown in block form in FIG. 5 and shown in detail in FIG. 6B. Resistors 4 and 5 form a voltage divider across the tip and ring. Capacitor 6 is connected across 4 and 5 through steering diodes 7 or 8, respectively. The conducting diode is determined by the polarity of any voltage present between the tip and ring for communication path 2. Capacitor 6 charges through the conducting steering diode to one-half the open circuit talk battery voltage. The microcontroller U3 polls the charge state of the capacitor by generating a logic high (+5 VDC) from U3 P2.2 to transistor 11 through current limiting resistor 1. This forces transistor 11 into conduction, resulting in the flow of current from the +12 VDC supply, through current limiting resistor 2, and the LED (terminals 2&4) of opto-isolator 10. The phototransistor of opto-isolator 10 conducts due to current flow in the associated LED, allowing 6 to discharge through current limiting resistor 3 and the LED (terminals 4&2) of opto-isolator 9. Current flowing in the LED of 9 forces the associated phototransistor to conduct, placing GROUND on P2.3 input of microprocessor U3. The microcontroller software polls the state of the input to determine the presence of talk battery on communication path 2. If the pin state is logic high (+5 VDC), no talk battery is present. If the state is logic low (GROUND), talk battery is present on the The system of the invention also includes a communication path switching circuit 406, which is shown in block form in FIG. 5. This circuit connects a "Part 68" telephonic-type device to either the telephone land line or to the cellular system. The communication path switching circuit 406, shown in detail in FIG. 6C, consists of relay 12, a transistor 13, a current limit resistor 14, and a diode 15. The "Part 68" telephonic device terminals are connected to the contacts 12A–12F of relay 12. Contacts 12A–12C switch one terminal of the "Part 68" device between communication path 1 and the cellular interface. Contacts 12D, 12E, & 12F switch the other terminal. Control of relay 12 is accomplished by a signal from microprocessor U3. A logic high (+5 VDC) from U3 P2.1 is applied to transistor 13 through current limiter 14. Transistor 13 conducts upon application of the logic high, allowing current to flow through the coil of relay 12, changing the state of the relay and connecting the "Part 68" device to the cellular interface. A logic low (GROUND) from U3 P2.1 cuts 13 off, terminating the coil current of 12, allowing the relay to change state and connecting the "Part 68" device to communication path 1. The two terminals of the "Part 68" device is initially installed so that they are connected to the outer pair of tip and ring terminals of the RJ-11 jack, which is indicated as T2 and R2 in FIG. 6C. If the land line connection is to be performed, the switch 406 moves the contact arms to connect T2 and R2 to contact arms 12B and 12E, which connect the outer terminals of the RJ-11 jacks to the inner tip and ring terminals and disconnect, or decouple, the connection with the cellular interface unit elements, such as interface circuitry 206, ringer 203, etc., as seen in FIG. 5. If the telephone is to be connected to the cellular network, then T2 and R2 are connected to 12C and 12F, respectively, thereby decoupling the outer tip and ring terminals from the inner tip and ring terminals, and connecting the telephone or telephones to the cellular interface elements 206, 203, etc.

Figure 6D:
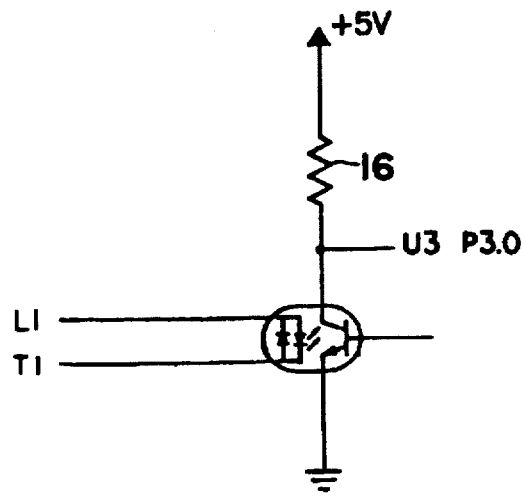

The system of the invention has a loop current detection circuit 410, shown in block form in FIG. 5, which detects the presence of loop current flowing on communication path 1 or the land line. This circuit 410, detail in FIG. 6D, provides an electrically isolated logic signal to microprocessor U3 indicating an on-hook or off-hook condition for the "Part 68" device when connected to the central office via land-line path 1. The loop current detection circuit 410 consists of pullup resistor 16 and optoisolator 17. The circuit functions as follows: The loop current path between land-line communication path 1 and the "Part 68" telephonic device flows through the bi-directional LED (terminals L1 & T1) of optoisolator 17. The presence of loop current (off-hook condition) forces the phototransistor in opto-isolator 17 to conduct, placing a logic low (GROUND) on input P3.0 of microcontroller U3. The absence of loop current (on-hook condition) cuts off the phototransistor of 17, placing a logic high (+5 VDC) via 16 on U3 P3.0.

Figure 6E:
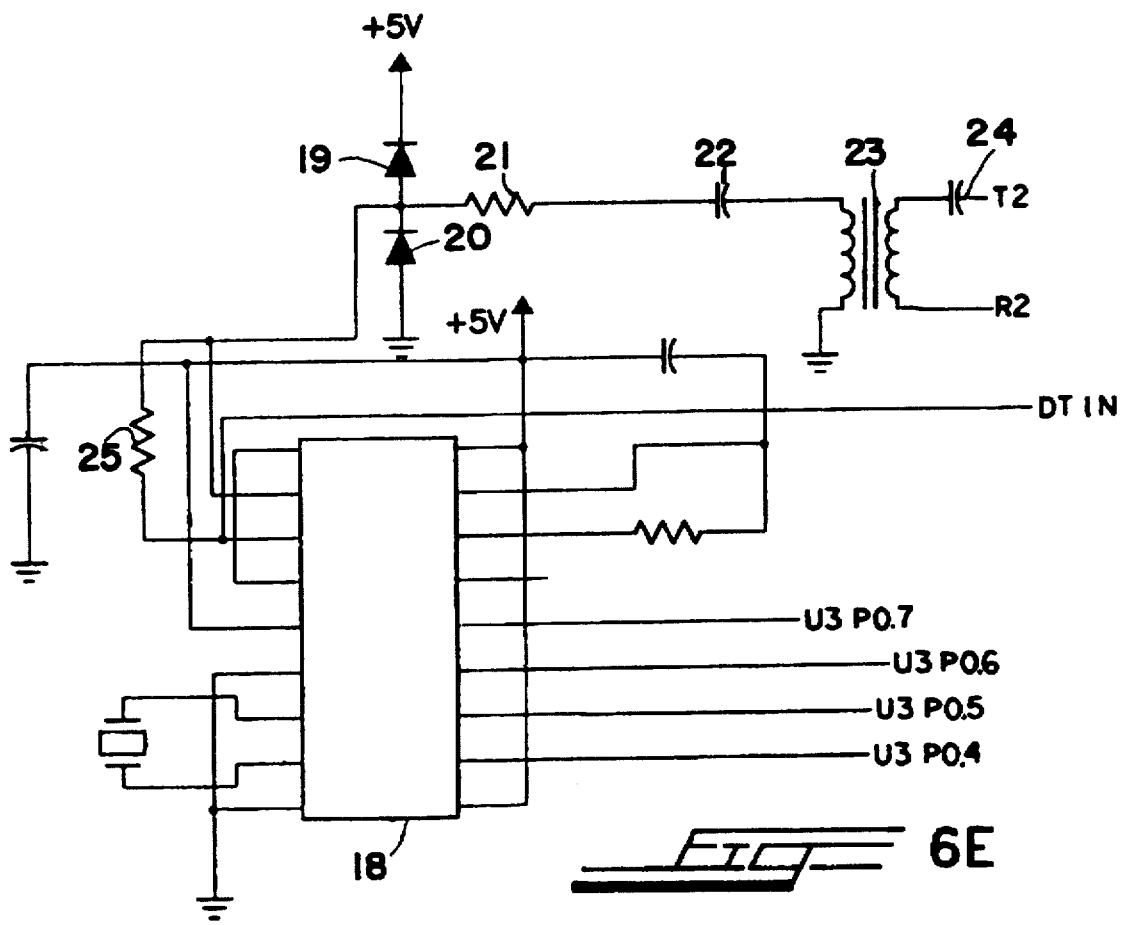

A modified DTMF (Dual Tone—Multiple Frequency) detection circuit 420, shown in block form in FIG. 5, couples DTMF signals from communication path 2, the cellular link, (either by loop voltage or loop current variations) for processing by microprocessor U3. The components of the modified DTMF Detection Circuit 420, shown in detail in FIG. 6E, consists of a DTMF decoder 18, clamp diodes 19 and 20, limiting resistors 21 and 25, DC blocking capacitors 22 and 24, and transformer 23. Transformer 23 is a 1:1 isolation transformer with 600 ohm primary and secondary impedances. The primary of transformer 23 is connected across the tip and ring (T2 & R2) of communication path 2 through capacitor 24. DTMF signals present on communication path 2 are coupled through capacitor 24 to transformer 23 primary and across transformer 23 to the secondary. From transformer 23 secondary the isolated DTMF signals are routed to the DTMF decoder 18 via resistor 25 for processing.

Figure 6F:
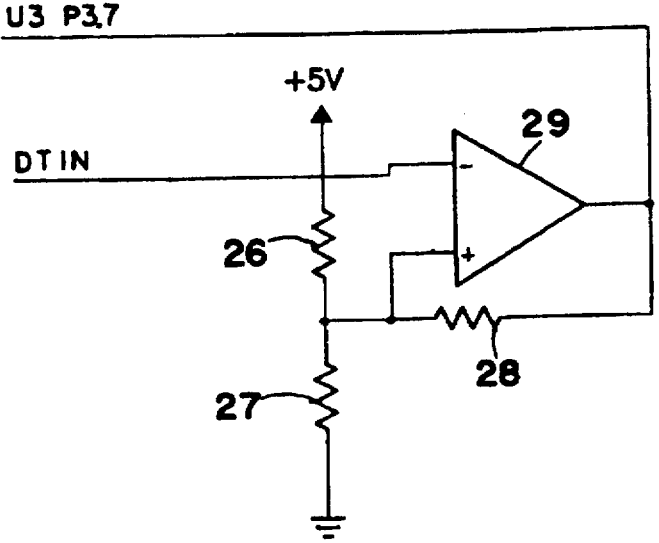

The system of the invention also includes a dial tone detection circuit 430, shown in block form in FIG. 5, which provides an electrically isolated signal to the microprocessor U3 for the purpose of determining the presence of a dial tone signal. As shown in detail in FIG. 6F, the circuit 430 consists of resistors 26–28, and a comparator 29. A sample of the audio signal on communication path 2 is conveyed to the inverting input of comparator 29 (pin 6) from DTMF decoder 18, previously discussed. When the audio signal at comparator 29 pin 6 exceeds the threshold established by voltage divider resistors 26 and 27 at comparator 29 pin 5, the output of 29 (pin 7) changes state from a logic high (+5 VDC) to a logic low (GROUND). In the case of dial tone audio, the logic signal takes on the form of a periodic pulse train. These logic state changes are conveyed to U3 input P3.7 for processing by the microprocessor software.

Figure 6G:
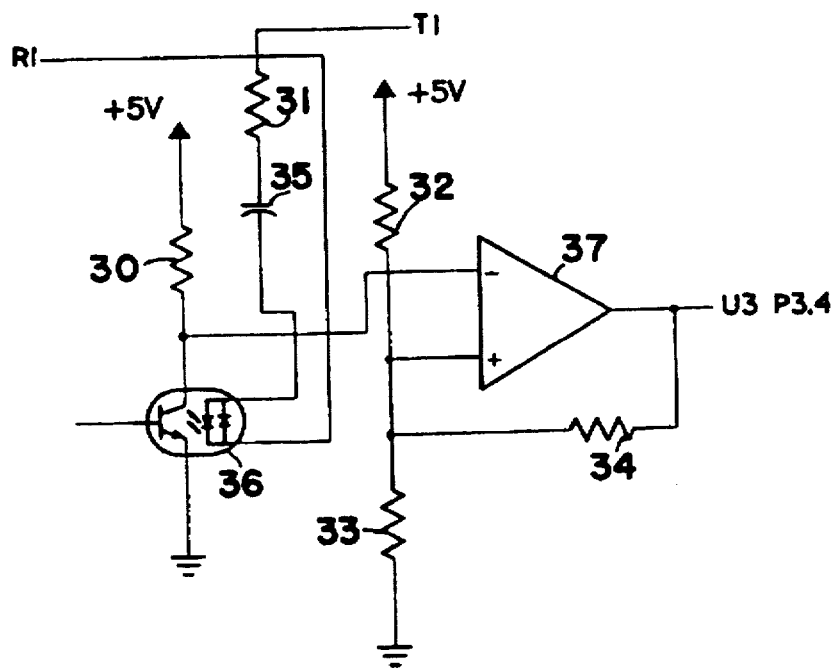

The system of the invention has a ring signal detection circuit 440, shown in block form in FIG. 5, which detects the presence of a ring signal voltage or current on communication path 1, originating in the central office, and it provides an isolated logic level to the microcontroller indicating the occurrence of a ringing event. As shown in detail in Fig. 6G, the components of the Ring Signal Detection Circuit 440 consists of resistors 30–34, a capacitor 35, an opto-isolator 36, and comparator 37. The circuit functions as follows: The Central Office ringing signal is coupled from communication path 1 via R1 through current limiting resistor 31, DC blocking capacitor 35, the bi-directional LED (terminals 1&2) of 36, and returning via T1. Application of the ringing signal to 36 causes the LED to illuminate forcing the associated phototransistor to conduct. The conducting phototransistor places a ground at the inverting input of comparator 37 pin 9 forcing the output of 37 pin 8 to a logic high (+5 VDC). The termination of the central office ringing signal cuts off the LED illumination of 36, forcing the phototransistor into a non-conducting state, and placing +5 VDC on pin 9 of 37 via pull-up resistor 30. This condition results in a logic low (GROUND) output from pin 8 of 37. The logic states indicating the presence/absence of ringing signals are conveyed to microprocessor U3 input P3.4 for processing by the microprocessor software.

Figure 6H:
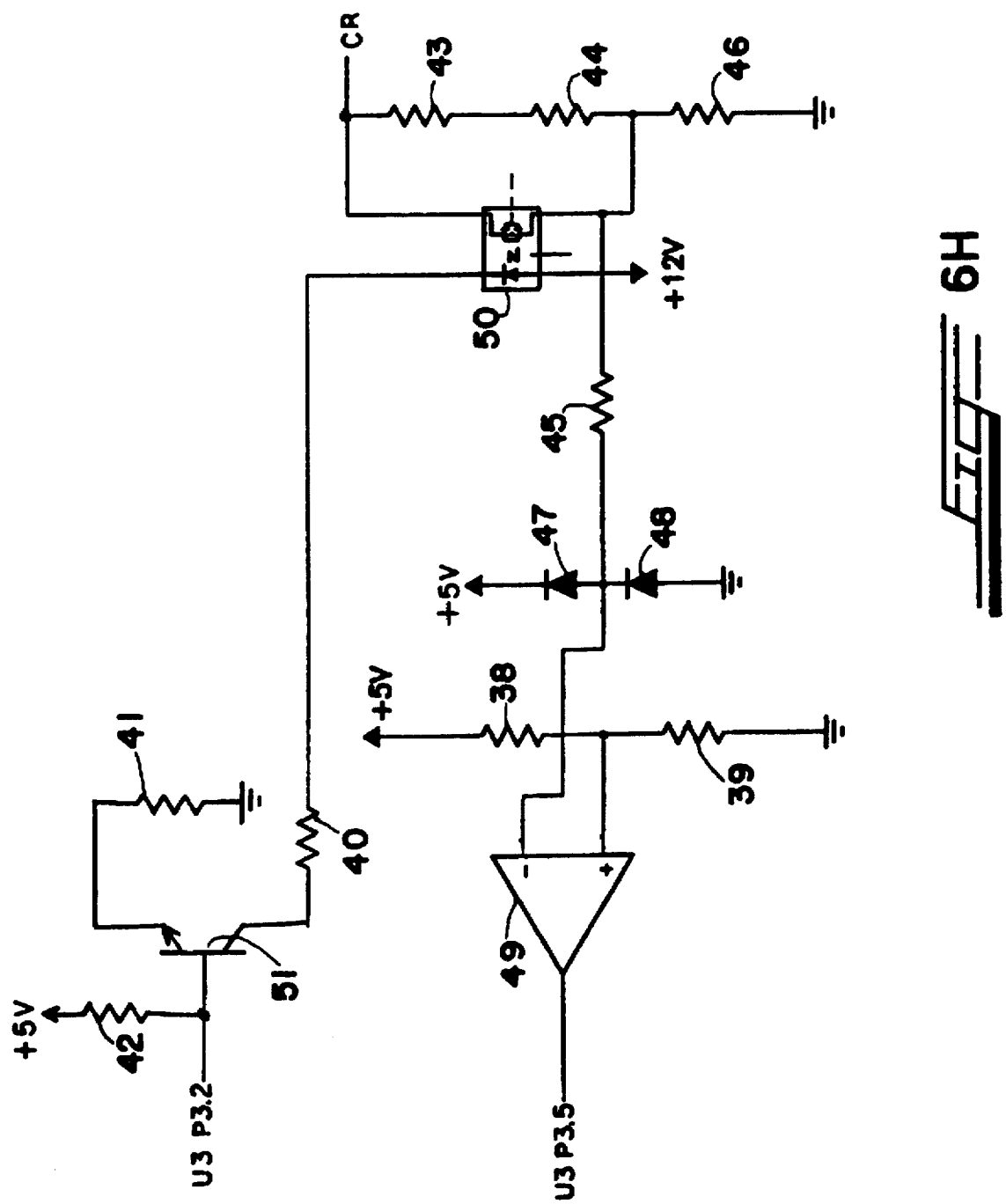

The system of the invention has a ringer detection circuit 450, shown in block form in FIG. 5, which tests to determine if a "Part 68" telephonic device has been connected to communication path 2. Testing is accomplished by placing a test ringing signal on the path, and observing the presence of current flow in the path due to the signal and a connected "Part 68" device. The presence or absence of the Part 68 device is transmitted to the microcontroller as a logic signal. As shown in detail in FIG. 6H, the ringer detection circuit 450 consists of resistors 38–46, clamp diodes 47 and 48, a comparator 49, a solid state relay 50 and a transistor 51. The circuit functions as follows: A test ringing signal is generated by block 203, described previously, and applied to the communication path 2. If an on-hook, Part 68 telephonic device is connected to the path, the ringing signal forces current to flow through resistor 46, solid state relay 50, to the connected Part 68 device and the ringer signal generator 203 via CR. Solid state relay 50 is closed and shunts 43 & 44 due to a U3 P3.2 microcontroller signal applied through 40, 41 and 51. A voltage develops across resistor 46 due to the ringer current flow, and is applied to the inverting input (pin 2) of comparator 49 via resistor 45 and clamp diodes 47 & 48. The application of voltage to comparator 49 forces the device output at pin 1 to a logic low state (GROUND). The output of comparator 49 pin 1 is input to the microprocessor U3 at input P3.5 for processing. Removal of the ringing signal, or the lack of an on-hook "Part 68" device connected to the path, forces 49 to a logic high state (+5 VDC).

Figure 6I:
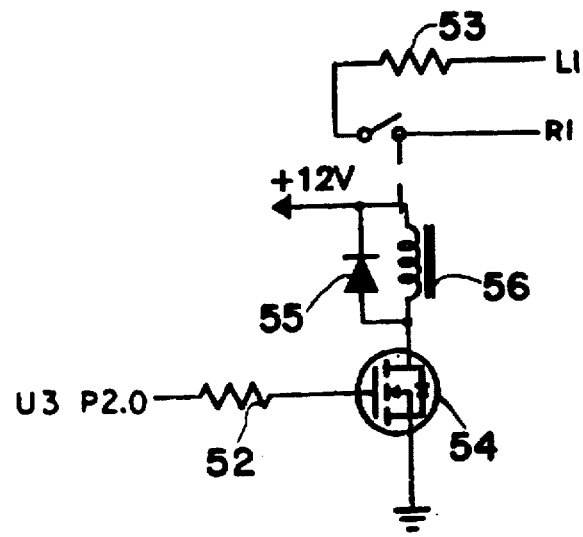

The system of the invention has a call hold circuit 470, shown in block form in FIG. 5, which continues loop-current flow through the normal communication path 1 while the "Part 68" telephonic type device is disconnected from the normal communication path 1 and connected to cellular interface. As shown in detail in FIG. 6I, the call hold circuit consists of resistors 52 and 53, a transistor 54, a diode 55, and a relay 56. Microprocessor U3 generates a logic high (+5 VDC) at P2.0. This signal is applied to transistor 54, via current limiting resistor 52, forcing 54 to conduct. Conducting transistor 54 causes current to flow through the armature coil of relay 56, closing the associated contacts. The contact closure forces loop current from communication path 1 to flow through terminating resistor 53 via L1 & R1. With communication path 1 terminated in this manner, the "Part 68" telephonic device may be connected to cellular interface without terminating a call in progress on communication path 1. A logic low (GROUND) at U3 P2.0 terminates the relay 56 closure condition.

Figure 6J:
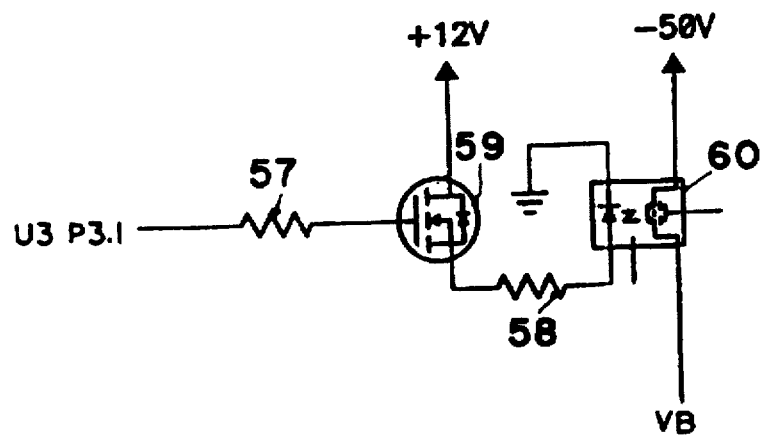

The system of the invention has a battery control voltage circuit 480, shown in block form in FIG. 5, which enables or disables the generation of voltages supplied to the "Part 68" telephonic type device loop circuit. As shown in detail in FIG. 6J, the battery control voltage circuit consists of resistors 57 and 58, a transistor 59, and a solid state relay 60. The circuit enables or disables cellular interface talk battery generation as follows: A logic signal from microprocessor U3 P3.1 controls the operation of the circuit. The logic signal is applied to transistor 59 via current limit resistor 57. A logic high (+5 VDC) turns transistor 59 on, closing solid state relay 60 at terminals 4 & 6. The relay closure allows the application of −50 VDC, generated by previously described block 210 at VB, to the "Part 68" device. A logic low at U3 P3.1 opens relay 60 terminals 4 & 6, terminating the battery voltage connection.

The system control flow from a power on condition to a normal running condition is depicted by FIG. 7. A Start condition 701 is shown indicating the start of control flow from the power-on condition. First, software guarantees that the talk battery control voltage is turned off (even though this is the default hardware state) by writing an active low to U3, port P3.1 indicated by process block 702. After the talk battery control voltage is turned off, the software flow proceeds to process block 703, to test the outer telco land-line pair. The outer telco pair is determined to be active if an active high is detected by software on U3, port P2.3, after software holds U3, port P2.2 high. Software does not hold U3, port P2.2 high before pulsing it three times, and then holding it low, in order to discharge any potential floating capacitance on the line. Software then proceeds to check if the outer pair is active indicated by decision block 704. A process block 705 is executed if the outer telco pair is active in order to display an error message through the radio, at which time, the software proceeds to the Fatal Error state 706. While in the Fatal Error state 706, the system must be repowered. If, however, the outer telco pair is detected as being inactive, then the talk battery voltage is turned on indicated by process block 707. Then software proceeds to process block 708, for complete installation of the system of the invention.

The process block, item 708, indicates a software test to ensure that at least one standard telephonic type communication device is correctly connected. This is done through software by applying an active high to U3, port P3.2 to turn on ring voltage, then applying a 20 Hz signal to U3, port P1.5 and detecting a 20 Hz signal at U3, port P3.5. After software does this check, the ring voltage is turned off (active low on U3, port P3.2). If the 20 Hz signal is detected, then it is assumed that at least one standard telephonic type communication device is correctly connected. Then, software proceeds through a decision block, item 709, to process block 711. If, however, there is no standard telephonic type communication device signal seen, then software indicates this through the radio display 710, and loops back to the process block 708 until at least one standard telephonic type communication device is correctly connected.

When it has been determined that the outer telco pair is inactive and at least one standard telephonic type communications device is correctly connected, software proceeds to the process block 711 to test that the inner telco pair is active. Software recognizes a telco inner pair connection by asserting an active high on the hardware telco hold line through U3, port P2.0 and checking that telco loop current is present (active low on input U3, port P3.0). If telco loop current is not present (through decision block 712), then an error message is displayed through the display of the cellular telephone indicated by process block 713. Then, the software proceeds directly to an idle state 714.

Figure 8:
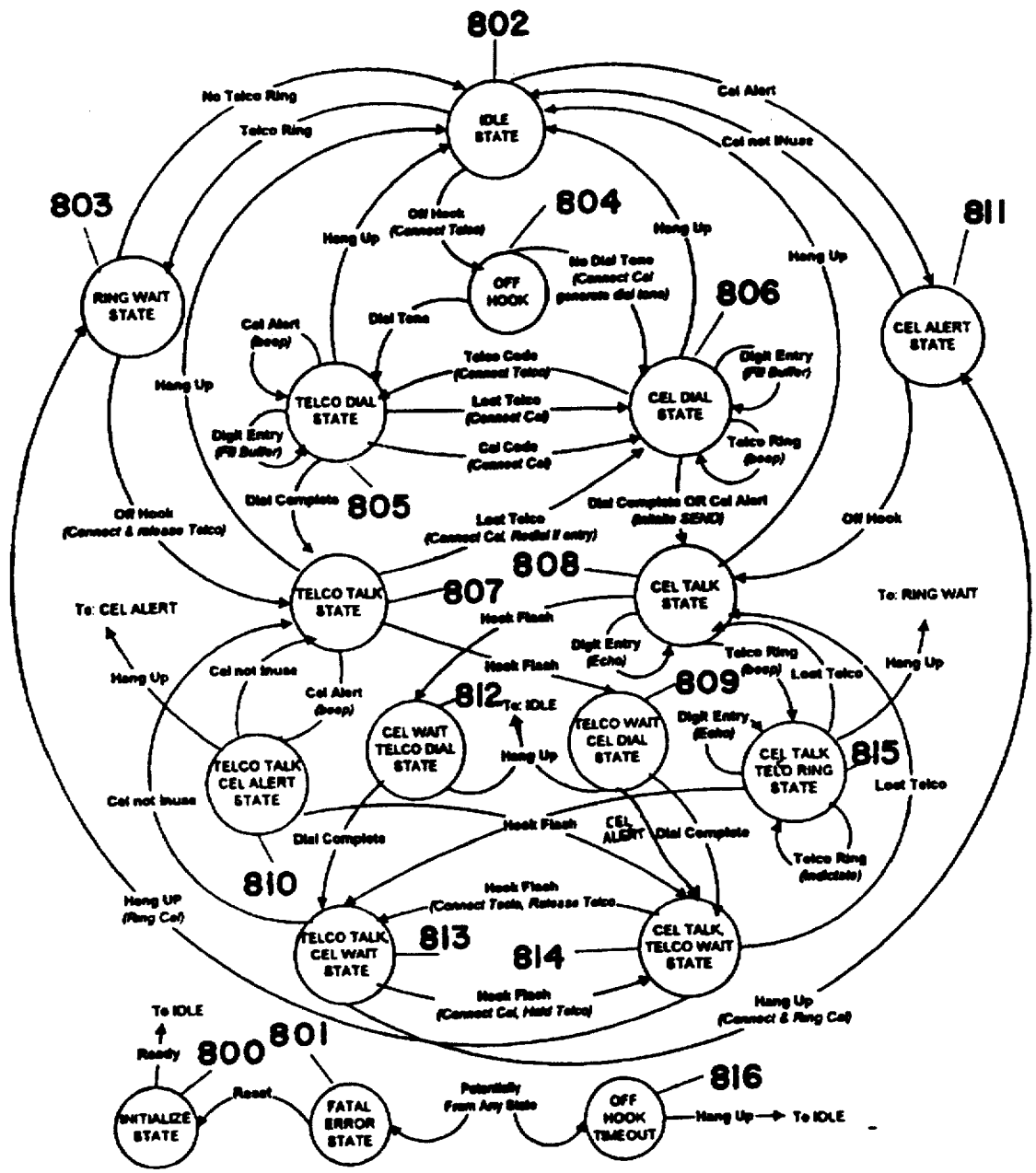
FIG. 8 is a state diagram showing the operation of the invention as controlled by software.

The general system control flow is depicted by the state diagram in FIG. 8. An Initialize State 800 is in effect when the system is reset or initially turned on. During the Initialize State 800, communication lines are monitored to verify that appropriate connections exist in order to support product functionality. If the connections are correct, an Idle State 802 becomes active. If the connections are not correct, or some non recoverable error occurs, then a Fatal Error State 801 becomes active, as discussed above with reference to FIG. 7. The Idle State 802 is the main state that occurs when the system is ready and waiting for some event to occur. Events that will initiate a response while in the Idle State 802 are: the incoming Telco Ring event, the Off Hook from the POTS device event, and the incoming Cel Alert event. The Telco Ring event will cause a Transition to a Ring Wait State 803. The Off Hook event will connect the telco line and cause a transition to the Off Hook State 804. The Cel Alert event will connect the cellular line and cause a transition to a Cel Alert State 811.

The Off Hook State 804 becomes active whenever the Off Hook event occurs from the Idle State 802. While in the Off Hook State 804, the system checks for the presence of a telco dial tone from the telephone company indicated by the Dial Tone event and the No Dial Tone event. If the system detects the telco dial tone, a transition is made to a Telco Dial State 805. If, however, the Dial Tone event is not detected, the system connects the cellular line, generates a cellular dial tone (differentiated from the telco dial tone), and then transitions to a Cel Dial State 806.

The Telco Dial State 805 represent a condition where the system is connected to the telco line, and the telephonic device is off hook. While in this state 805, the system will monitor and respond to one of six events: The Cel Alert event, the Digit Entry event, the Dial Complete event, the Cel Code digit entry event, the Lost Telco connection event, and the Hang Up event. If the Cel Alert is detected, the system will momentarily connect the cellular line, sound a beep, and then connect back to the telco line indicating to the user that there is an incoming call on the cellular line. If the Digit Entry is detected, the digit pressed is stored by the system in a digit buffer. If the digit buffer contains the appropriate digits (such as **C), or if the Lost Telco connection is detected, the system is then connected to the cellular line, the Cel Dial Tone is generated, and a transition is made to the Cel Dial State 806. If the Dial Complete event occurs, indicating that the user has finished dialing, then a transition is made into a Telco Talk State 807. The Hang Up event will simply cause a transition back to the Idle State 802. Any time a transition is made into the Telco Dial State 805 or the Cel Dial State 806, the digit buffer is cleared.

The Cel Dial State 806 represent a condition where the system is connected to the cellular line, and the POTS device is off hook. While in this state 806, the system will monitor and respond to one of six events: The Cel Alert event, the Digit Entry event, the digit Dial Complete event, the Telco Code digit entry event, the Telco Ring event, and the Hang Up event. If the Cel Alert or the Dial Complete is detected, the system will initiate cellular send command and transition to a Cel Talk State 808. If the Digit Entry is detected, the digit pressed is stored by the system in the digit buffer. If the digit buffer contains the appropriate digits (such as **T), the system is then connected to the telco line, and a transition is made to the Telco Dial State 805. If the Dial Complete event occurs, indicating that the user has finished dialing, then a transition is made into a Cel Talk State 808. If the Telco Ring event occurs, the system will sound a beep indicating that an incoming call has been detected on the telco line. The Hang Up event will simply cause a transition back to the Idle State 802.

The Telco Talk State 807 represents a state where a connection to another party has been established on the telco line. This may occur either through an incoming call from the Ring Wait State 803, or through an ongoing call from the Telco Dial State 805. While in the Telco Talk State 807, the system will monitor and respond to one of four events: The Hang Up event, the Lost Telco connection event, the Cel Alert Event, and the hook Flash Event. The Hang Up event will simply cause a transition back to the Idle State 802. If the Lost Telco connection is detected, the system will connect the cellular line and check to see if there is a complete entry in the digit entry buffer meaning a number had been dialed as an out going call. If the digit entry is complete, the entry is redialed on the cellular line and a transition is made to the Cel Dial State 806. However, if a complete entry does not exists in the buffer, then the transition is made to the Cel Dial State 806 and the cel dial tone is generated. If the Hook Flash event occurs, the telco line is put on hold by the system, the cellular line is then connected, and a transition is made to a Telco Wait Cel Dial State 809. If the Cel Alert is detected, the system will momentarily connect the cellular line, sound a beep, and then connect back to the telco Line and then cause a transition to a Telco Talk Cel Alert State 810.

The Cel Talk State 808 represents a state where a connection to another party has been established on the cellular line. This may occur either through an incoming call from the Cel Alert State 811, or through an ongoing call from the Cel Dial State 806. While in the Cel Talk State 808, the system will monitor and respond to one of four events: The Hang Up event, the Telco Ring event, the digit entry event, and the Hook Flash Event. The Hang Up event will simply cause a transition back to the Idle State 802. The Digit Entry event will be audibly produced or echoed to the user. If the Telco Ring event is detected, the system will sound a beep indicating an incoming call on the telco line and transitions to Cel Talk Telco Ring State 815. If the Hook Flash event occurs, the telco line is then connected, a transition is made to a Cel Wait Telco Dial State 812.

The Cel Wait Telco Dial State 812 represents a state where a connection to another party has been established on the cellular line, and the user has done a hook flash to dial out on the telco line without loosing the cellular party. Therefore this state 812 will respond to only one of two events: The Digit Dial Complete event for dialing another party, and the Hang Up event. The Hang Up event will simply cause a transition back to the Idle State 802. The Dial Complete event will cause a transition to a Telco Talk Cel Wait State 813.

The Telco Wait Cel Dial State 809 represents a state where a connection to another party has been established on the telco line, and the user has done a hook flash to dial out on the cellular line without losing the telco line party. Therefore this state 809 will respond to only one of three events: The Dial Complete event for dialing another party, the Cel Alert event, and the Hang Up event. The Hang Up event will simply cause a transition back to the Idle State 802. If the Dial Complete or the Cel Alert events occur, the system will initiate a send command and will cause a transition to a Cel Talk Telco Wait State 814.

The Telco Talk Cel Alert State 810 represents a state where a connection to another party has been established on the telco line, and Cel Alert has occurred. In this state 810, the system will respond to the Hook Flash event, the Hang Up event, and the Cel not Inuse event. The Hang Up event will cause a transition to the Cel Alert State 811. The Cel not Inuse event will cause a transition back to the Telco Talk State 807. If the Hook Flash is detected, the system will put the telco line on hold, connect the cellular line, and make a transition into the Cel Talk Telco Wait State 814.

The Cel Talk Telco Ring State 815 represents a state where a connection to another party has been established on the cellular line, and the Telco Ring event has occurred. In this state 815, the system will respond to the Hook Flash event, the Hang Up event, the Digit Entry event, the Lost Telco event, and the Telco Ring event. The Hang Up event will cause a transition to the Ring Wait State 803. If the hook Flash is detected, the system connects the telco line, and makes a transition into the Telco Talk Cel Wait State 813. If the Telco Ring is detected, the system will sound a beep. If the Lost Telco connection occurs, a transition is made into the Cel Talk State 808. The Digit Entry event will cause the digit to be echoed on the telephonic device.

The Telco Talk Cel Wait State 813 represents a condition where the telco line is connected with an active party, and there is also a party waiting on the cellular line. In this Telco Talk Wait state 813, the system will respond to the Hook Flash event, the Cel Not Inuse Event, and the Hang Up event. If the Hook Flash occurs, the telco line is placed on hold, the cellular line is reconnected, and a transition to the Cel Talk Telco Wait State 814 is made. If the Cel not Inuse event occurs, a transition is made to the Telco Talk State 807. If the Hang Up event occurs, the system will reconnect the cellular line, begin ringing in order to re-establish connection with the party waiting on the cellular line, and make a transition to the Cel Alert State 811.

The Cel Talk Telco Wait State 814 represents a condition where the cellular line is connected with an active party, and there is also a party holding on the telco line. In this state 814, the system will respond to the Hook Flash event, the Lost Telco Event, and the Hang Up event. If the Hook Flash occurs, the telco line connected and released from hold, and a transition to the Telco Talk Cel Wait State 813 is made. If Lost Telco connection event occurs, a transition is made to the Cel Talk State 808. If the Hang Up event occurs, the system will leave the cellular line connected, begin ringing in order to re-establish connection with the party waiting on the telco line, and make a transition to the Ring Wait State 803.

The Ring Wait State 803 represents a condition where the telephonic device is hung up and ringing due to a party on the telco line. This can occur because there is an incoming call on the telco line, or because there is a previous party waiting on the telco line after hanging up on the cellular line through the Cel Talk/Telco Wait State 814. While in this state 803, the system will respond to the No Telco Ring event by making a transition back to the Idle State 802. The system will also respond to the Off Hook event by connecting the telco line (which may or may not be connected already), and releasing a potential hold, and then making a transition to the Telco Talk State 807.

The Cel Alert State 811 represents a condition where the telephonic device is hung up and ringing due to a party on the cellular line. This can occur because there is an incoming Cel Alert, or because there is a previous party waiting on the cellular line after hanging up on the telco line through the Telco Talk Cel Wait State 813. While in this state 811, the system will respond to the Cel not Inuse event by making a transition back to the Idle State 802. The system will also respond to the Off Hook event by making a transition to the Cel Talk State 808.

The Fatal Error State 801 is state where the system has determined that a non-recoverable error condition exists. In this state 801, the system must be turned off and/or reset. This state 801 may be potentially entered from any state capable of detecting a fatal error condition.

An Off Hook Timeout State 816 can occur any time the telephonic device is left unattended and in the off hook position. If this condition occurs in certain states, this state 816 will become active. While in this state 816, the only event that is allowed is the Hang Up event which causes a transition back to the Idle State 802.

Referring to FIGS. 9–19, detailed flow charts for the state diagram of FIG. 8 are shown.

Figure 9:
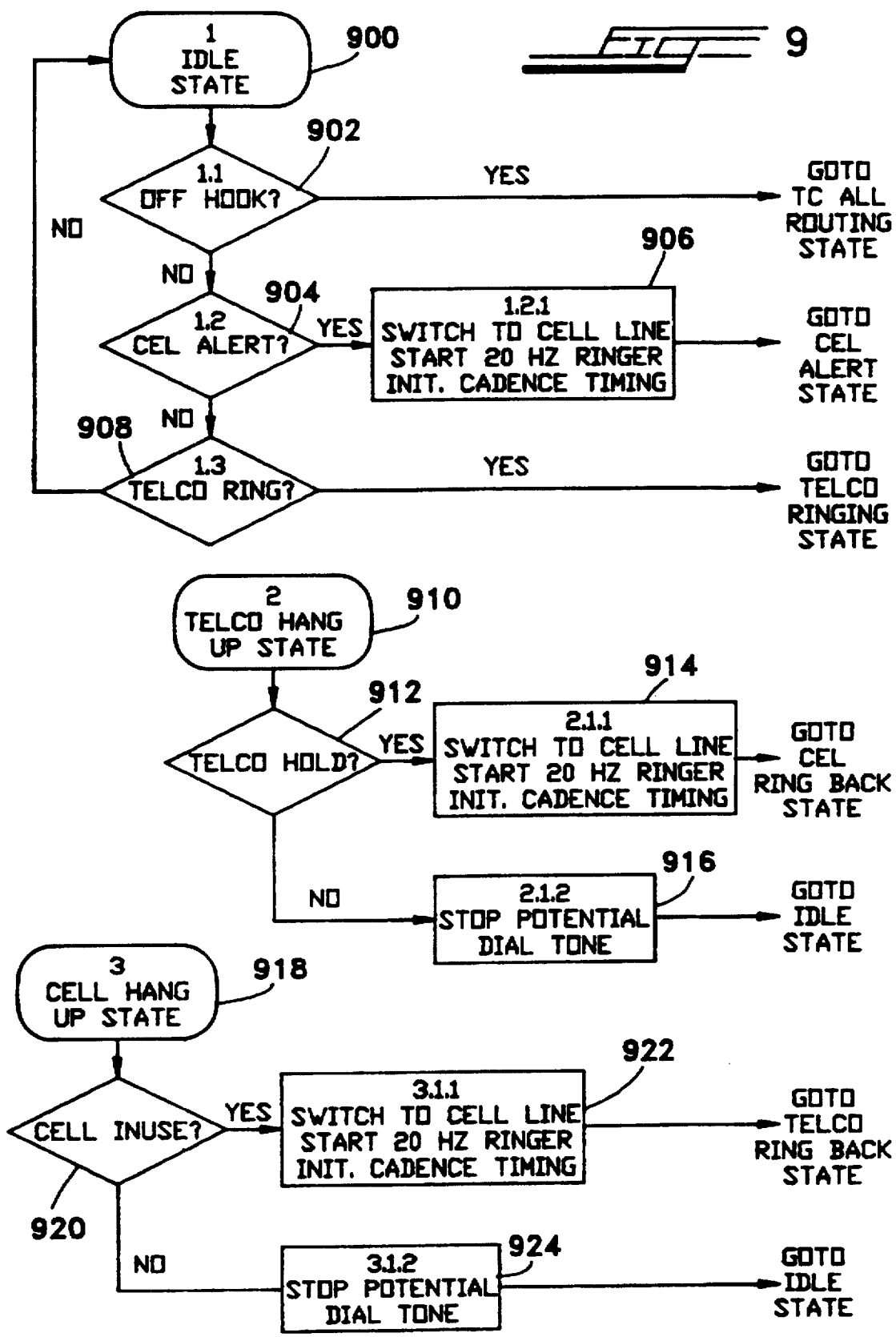
Figure 11:
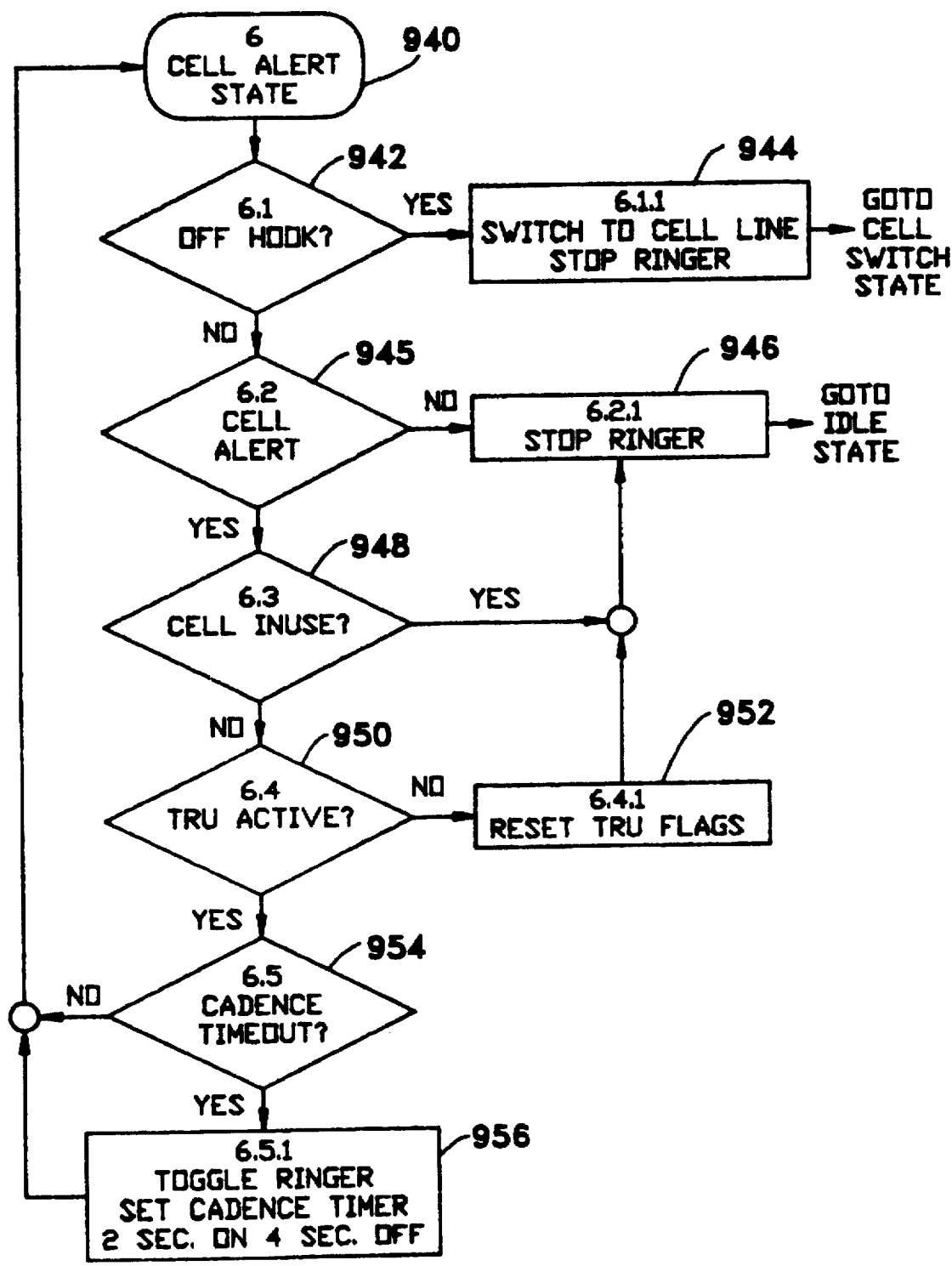
Figure 13:
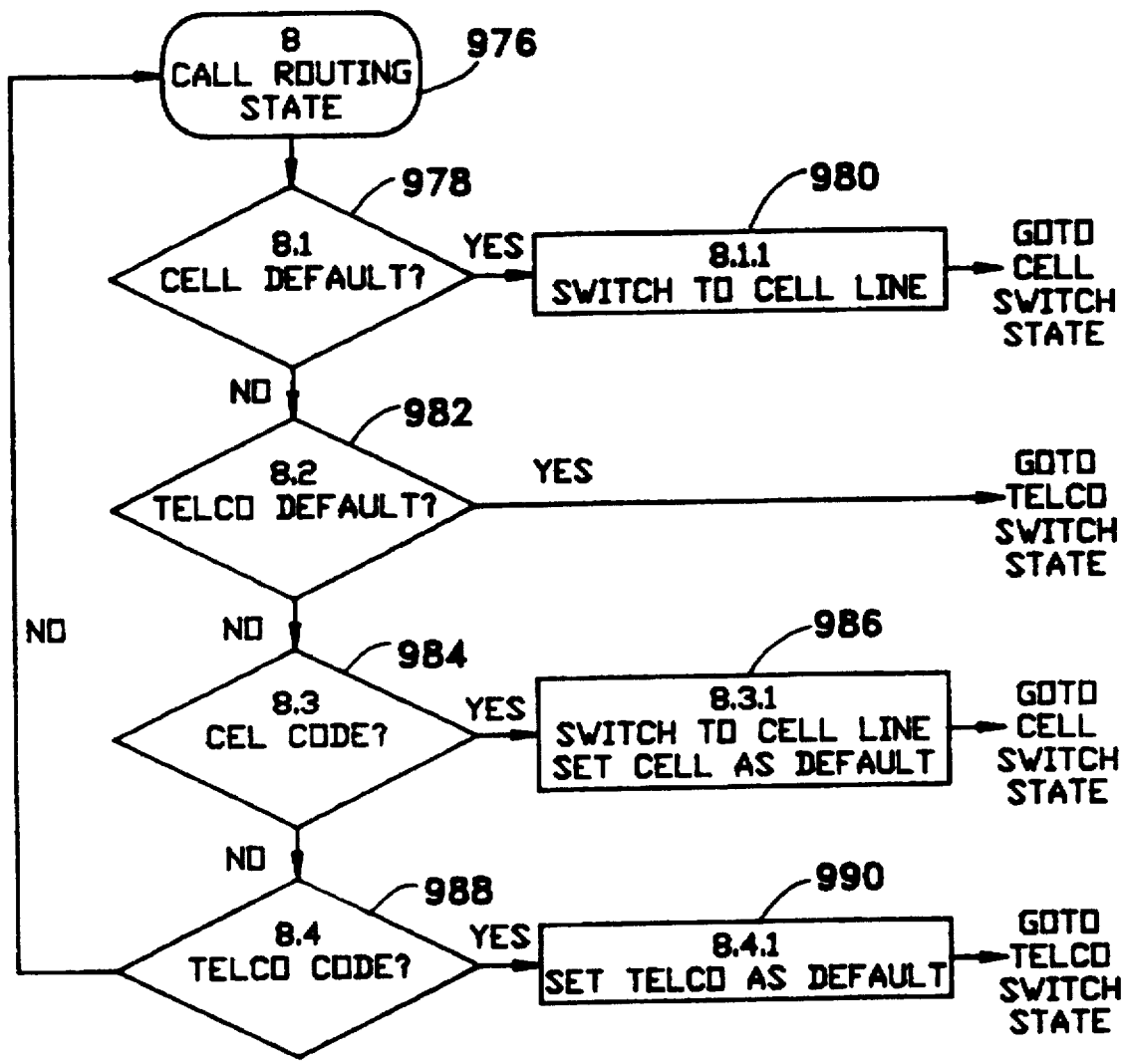

Referring to FIG. 9, the IDLE state (Block 900) is the main loop that occurs when the software is ready and waiting for some event to occur. The idle state becomes active on a power up (or reset) if the line connections are determined to be correct. Off Hook Software (Block 902) checks if the POTS (telephone) device is off hook by monitoring loop current on which ever line is active (i.e. telco or cellular). Presence of loop current means that the POTS is off hook. If an off hook is detected while in the idle loop, software transfers control to the call routine state (FIG. 13). Then, the software receives messages from the transceiver indicating activity of the cellular phone, or "Cel Alert" (Block 904). If software receives a cel alert message while in the idle loop, the following action is taken by software (Block 906): Relay is switched to the cellular line; a ring is initiated on the POTS device via 20 hz signal; and the ring cadence timing is initialized (2 seconds on, 4 seconds off); software control flow is transferred to the Cel Alert state (FIG. 11). If there is no "Cel Alert", then software checks (Block 908) if the POTS device is ringing, indicating an incoming telco call. If an incoming telco ring is detected while in the idle loop, software transfers control to the Telco Ringing state (FIG. 10).

Figure 12:
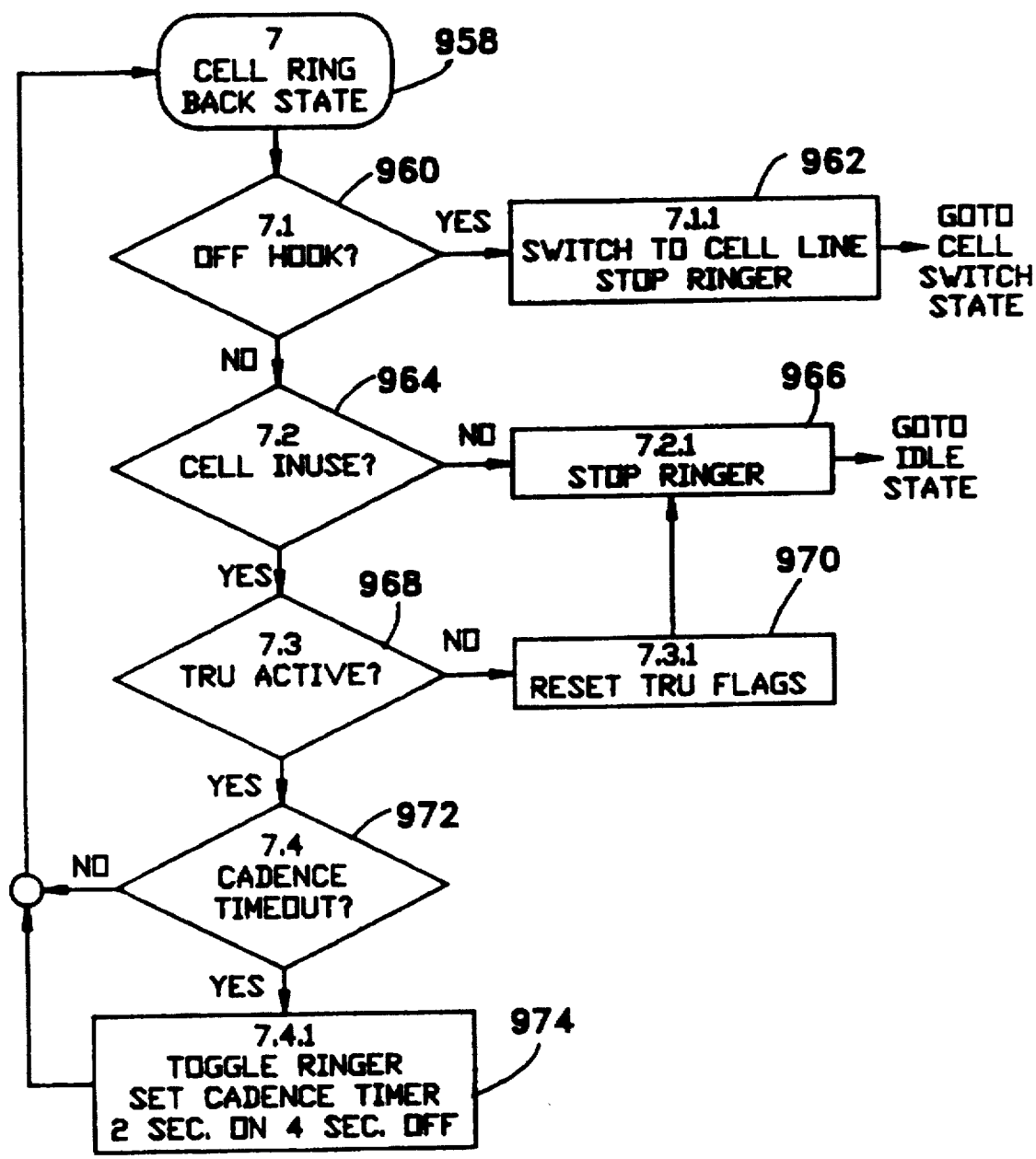

The Telco Hang Up state (Block 910) becomes the active software loop whenever the POTS device transitions from Off Hook to On Hook while connected to the telco line. While in the Telco Hang Up loop, software monitors the Hold line to see if the telco line has been put on hold (Block 912).If Telco Hold is active, the following action is taken by software while in the Telco Hang Up loop (Block 914): Relay is switched to the cellular line; a ring is initiated on the POTS device via 20 hz signal; the ring cadence timing is initialized (2 seconds on, 4 seconds off); and software control flow is transferred to the Cel Ring Back (FIG. 12). If, while in the Telco Hang Up loop, Telco Hold is NOT active, software stops any tones that may have been started (Block 914), and then transfers control flow to the idle loop (FIG. 9).

The cel Hang Up state (Block 918) becomes the active software loop whenever the POTS device transitions from Off Hook to On Hook while connected to the cellular line.

Cel Inuse Software is always receiving messages from the transceiver(TRU). The TRU is considered to be in an INUSE state if a Cel Inuse messages is received. Software assumes the TRU is Inuse until a NOT Inuse message is received (Block 920). If the TRU is Inuse, the following action is taken by software while in the Cel Hang Up loop (Block 922): Relay is switched to the cellular line; a ring is initiated on the POTS device via 20 hz signal; the ring cadence timing is initialized (2 seconds on, 4 seconds off); and software control flow is transferred to the Telco Ring Back (FIG. 10). If, while in the Telco Hang Up loop, the TRU is NOT Inuse, software stops any tones that may have been started (Block 924), and then transfers control flow to the idle loop (Block 900).

Figure 14:
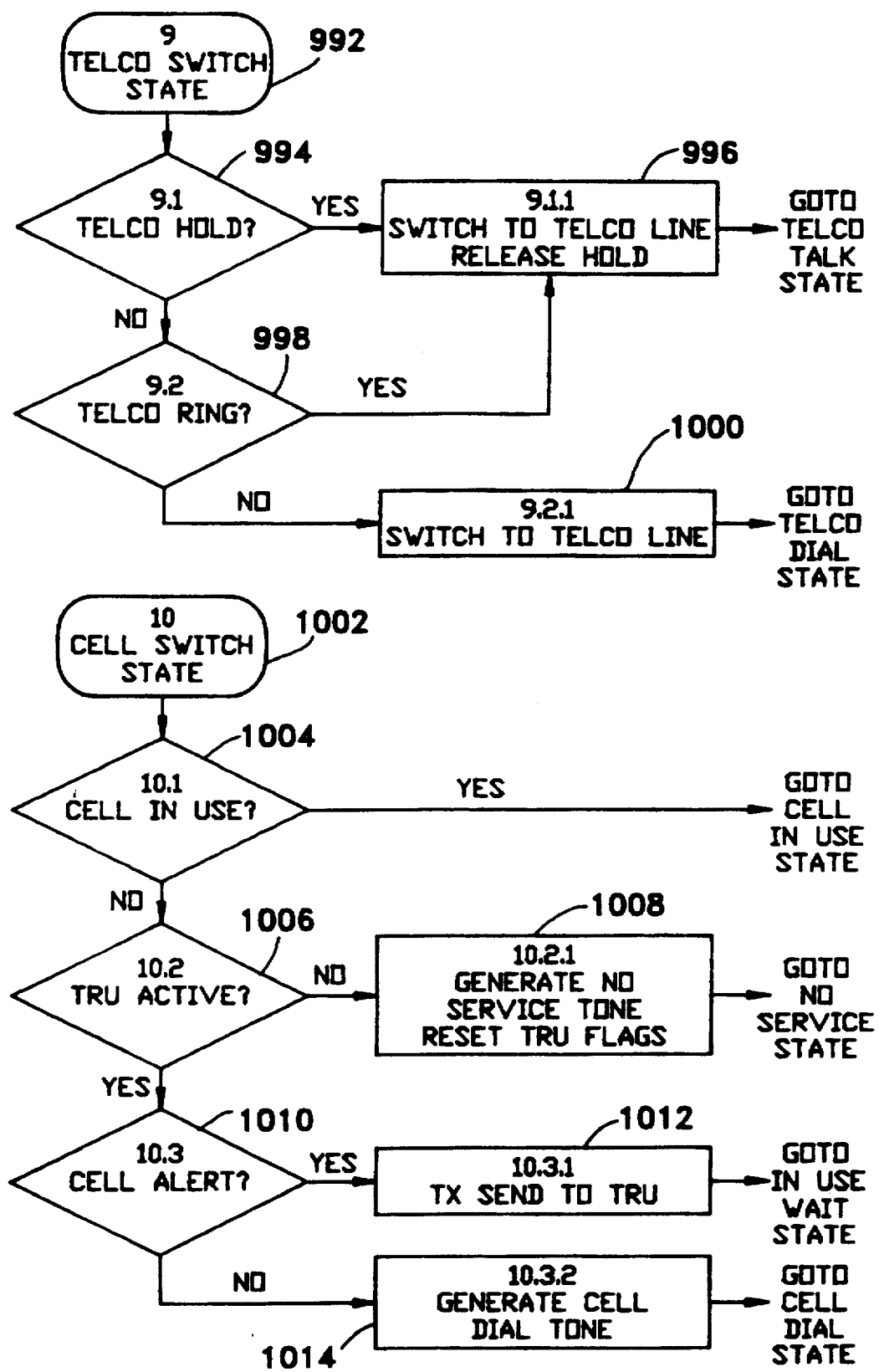

Referring now to FIG. 10, the Telco Ringing state (Block 926) becomes the active software loop for incoming calls on the telco line. Software checks if the POTS device is ringing by monitoring hardware input signal (Block 928). If the incoming telco ring has terminated while in the Telco Ringing loop, software transfers control to the Idle state (Block 900). Software then checks (Block 930) if the POTS device is off hook, by monitoring loop current on which ever line is active (i.e. telco or cellular). Presence of loop current means that the POTS is off hook. If an off hook is detected while in the Telco Ringing loop, software transfers control the Telco Switch state (FIG. 14).

The Telco Ring Back state (Block 932) becomes the active software loop when the POTS device is hung up and there was a call on the telco line left on hold. Software checks if the POTS device is off hook (Block 934) by monitoring loop current on which ever line is active (i.e. telco or cellular). Presence of loop current means that the POTS is off hook. If an off hook is detected while in the Telco Ring Back loop, software transfers control to the Telco Switch state, after turning off the ringer and resetting cadence timers (FIG. 14). If on hook, The cadence time-out (Block 936) is used by software to toggle the POTS ringer on/off for ring cadence. If the ringer was on when the time-out occurs, software resets the timer for 4 seconds and turns the ringer off. If the ringer was off, software resets the timer for 2 seconds and turns the ringer on (Block 938). Software then loops to the start of telco ring back (Block 932).

Referring to FIG. 11, the Cel Alert state (Block 940) becomes the active software loop when the POTS device is hung up and a Cel Alert message has been received from the TRU indicating an incoming call on the cellular line. Software checks if the POTS device is off hook (Block 942) by monitoring loop current on which ever line is active (i.e. telco or cellular). Presence of loop current means that the POTS is off hook. If an off hook is detected while in the Cel Alert loop, software transfers control to the Cel Switch state (FIG. 14), after turning off the ringer, resetting cadence timers, and switching the relay to the cellular line (Block 944). If on hook, software receives messages from the TRU indicating activity of the cellular phone. The fact that the Cel Alert state is active (Block 944) means a Cel Alert message has been received. However, software continues to monitor the Cel activity to see if the alert status goes away (Note: A Cel alert is ignored if the TRU is Inuse.) If the software receives a message indicating that the Cel Alert is no longer active while in the Cel Alert state, software will stop the ringer, reset cadence timers (Block 946) and transfer control to the Idle loop (Block 900). If the software receives a message indicating that the Cel is Inuse while in the Cel Alert state (Block 948), software will stop the ringer, reset cadence timers (Block 946) and transfer control to the Idle loop (Block 900). If the TRU is seen to go inactive (Block 950) while in the Cel Alert state, all TRU flagging is reset (Block 952), and software will stop the ringer, reset cadence timers (Block 946) and transfer control to the Idle loop (Block 900). The transceiver may become inactive from being turned off, or unplugged. The cadence time-out (Block 954) is used by software to toggle the POTS ringer on/off for ring cadence (Block 956). If the ringer was on when the time-out occurs, software resets the timer for 4 seconds and turns the ringer off. If the ringer was off, software resets the timer for 2 seconds and turns the ringer on. Software then loops to the start of Cel Alert loop (Block 940).

Referring now to FIG. 12, the Cel Ring Back state (Block 958) becomes the active software loop when a hang up occurs on the telco line and the TRU is Inuse. Software checks if the POTS is off hook (Block 960) by monitoring loop current on which ever line is active (i.e. telco or cellular). Presence of loop current means that the POTS is off hook. If an off hook is detected while in the Cel Ring Back loop, software transfers control to the Cel Switch state (FIG. 14), after turning off the ringer, resetting cadence timers, and switching the relay to the cellular line (Block 962). Software receives messages from the TRU indicating activity of the cellular phone. The fact that the Cel Alert state is active means a Cel Inuse message has been received (Block 964). Software continues to monitor the cel activity to see if the Inuse status goes away. If the software receives a message indicating that the Cel is not Inuse while in the Cel Ring Back state, software will stop the ringer, reset cadence timers (Block 966), and transfer control to the Idle loop (Block 900). If the TRU is seen to go inactive while in the Cel Ring Back state (Block 968), all TRU flagging is reset (Block 970) and software will stop the ringer, reset cadence timers (Block 966), and transfer control to the Idle loop (Block 900). TRU may become inactive from being turned off, or unplugged. The cadence time-out (Block 972) is used by software to toggle the POTS ringer on/off for ring cadence. If the ringer was on when the time-out occurs, software resets the timer for 4 seconds and turns the ringer off (Block 974). If the ringer was off, software resets the timer for 2 seconds and turns the ringer on. Software then loops to the start of Cel Alert loop (Block 940).

Referring now to FIG. 13, the Call Routing state (Block 976 becomes the active software loop whenever the POTS device transitions from On Hook to Off hook from the Idle state loop. While in the Call Routing state, software checks to see if a default (Block 978) has been set to which line (cellular or telco) to switch in. If a default has been set to the Cel line, it means that the system has been powered on and been set to Cel. In this case, software will switch the relay to the cellular line (Block 980), and transfer control to the Cel Switch state (FIG. 14). If a default has been set to the Telco line (Block 982), it means that the system has been powered on and been set to Telco. In this case, software will leave the relay alone and transfer control to the Telco Switch state (FIG. 14). While in the Call Routing state, software monitors the digit input status from the POTS device. Digits are accepted either as DTMF signals or by pulse detection. If a default has NOT been previously set software checks for a s of C to be the Cel Code (Block 984). If the Cel Code is detected while in the Call routing state, then software sets the default to be the Cellular line, switches the relay to the cel line (Block 986), and transfers control to the Cel Switch state (FIG. 14). While in the Call Routing state, software monitors the digit input status from the POTS device (Block 988). Digits are accepted either as DTMF signals or by pulse detection. If a default has NOT been previously set, software checks for a sequence of T to be the Telco Code. If the Telco Code is detected while in the Call routing state, then software sets the default to be the Telco line (Block 990), leaves the relay alone, and transfers control to the Telco Switch state (FIG. 14).

Referring now to FIG. 14, the Telco Switch state (Block 992) is a general purpose software decision node used to route control flow to the appropriate off hook telco line state. While in the Telco Switch loop, software monitors the Hold line (Block 994) to see if the telco line has been put on hold. If Telco Hold is active, software switches the relay to the telco line, then releases the hold (Block 996), and then transfer control to the Telco Talk state (FIG. 16). While in the Telco Switch loop, software monitors POTS device to see if an incoming telco call is in progress (Block 998). If it is, software switches the relay to the telco line (Block 1000), then releases the hold, and then transfers control to the Telco Talk state (Fig. 16). If, while in the Telco Switch loop, Telco Hold is NOT active and there is no incoming telco call, software switches the relay to the telco line and then transfers control flow to the Telco Dial state (FIG. 15).

The Cel Switch state (Block 1002) is a general purpose software decision node used to route control flow to the appropriate off hook cellular line state. If a Cel Inuse message has been received from the TRU (Block 1004), software control is transferred to the Cel Inuse state (FIG. 18). While in the Cel Switch state, the TRU is monitored for activity (Block 1006). TRU may become inactive from being turned off, or unplugged. If the TRU is seen to go inactive while in the Cel Ring Back state, all TRU flagging is reset, a no service tone is generated (Block 1008), and control flow is transferred to the No Service state (FIG. 19). While in the Cel Switch loop, software monitors TRU device to see if an incoming Cel alert message has been sent (Note: the alert message is ignored if the TRU is Inuse.) If a Cel Alert message has been received (without a Cel Inuse), software transmits the SEND command to the TRU to answer the call (Block 1012), and then transfer control to the Cel Inuse Wait state (FIG. 19) in order to wait for the TRU to come Inuse. Prior to transferring to Cel Inuse Wait, an in use timer is set. If the TRU is active, there Cel is not Inuse, the software starts the dial tone (Block 1014), and transfers control to the Cel Dial state (FIG. 17).

Figure 15:
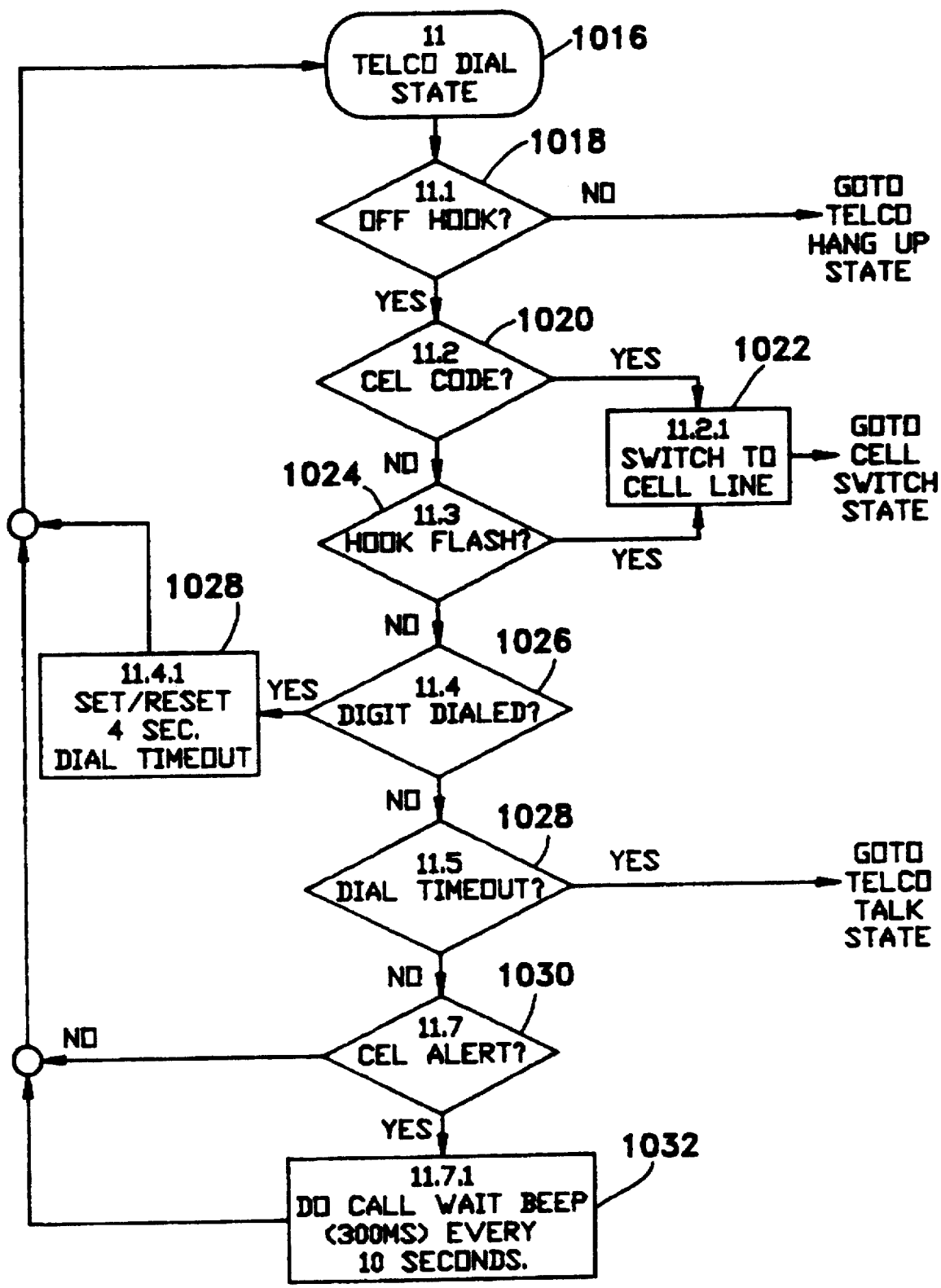
Figure 16:
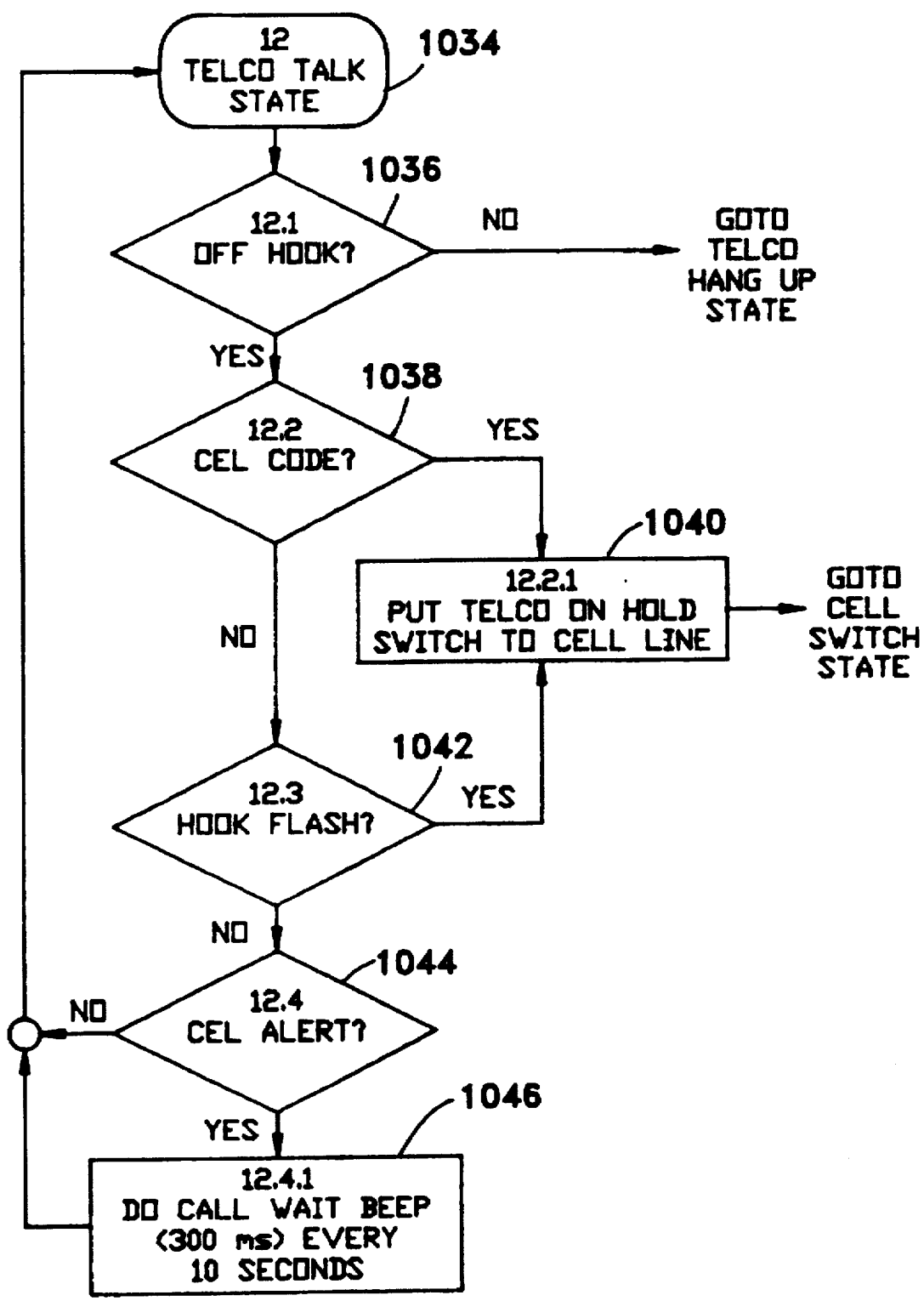

Referring now to FIG. 15, the Telco Dial state (Block 1016) becomes the active software loop anytime a switch to the telco line is made with the POTS device off hook and the telco line was NOT left on hold and there is NOT an incoming telco call. Software checks if the POTS device is off hook (Block 1018) by monitoring loop current on which ever line is active (i.e. telco or cellular). Presence of loop current means that the POTS is off hook. If, while in the Telco Dial State, loop current goes away (for more than 700 mS) then the POTS device is considered to be On hook or Hung up. If a hang up occurs, software transfers control to the Telco Hand Up state (Block 910). While in the Telco Dial state, software monitors the digit input status from the POTS device. Digits are accepted either as DTMF signals or by pulse detection. Software checks for a sequence of **C to be the Cel Code (Block 1020). If the Cel Code is detected while in the Telco Dial state, then software switches the relay to the cel line (Block 1022), and transfers control to the Cel Switch state (Block 1002). A hook flash is detect (Block 1024) by software as the absence of loop current for between 20 and 200 milli seconds. If a hook flash is detected while in the Telco Dial state, then switches the relay to the cel line (Block 1022), and transfers control to the Cel Switch state (FIG. 14). While in the Telco Dial state, software monitors the digit input status from the POTS device (Block 1026). Digits are accepted either as DTMF signals or by pulse detection. Each time a digit is detected by software a dial timer is reset to four seconds (Block 1028). If the four second timer set from the digit detection times out (Block 1028), software assumes that a call is being made and control is transferred to the Telco Talk state (FIG. 16). While in the Telco Dial state, the TRU is monitored to see if a Cel Alert message is received (Block 1030). If a Cel Alert is received, software initiates a call wait beep every 10 seconds while the Telco Dial state is active (Block 1032).

Referring now to FIG. 16, the Telco Talk state (Block 1034) becomes the active software loop anytime a switch to the telco line is made with the POTS device off hook and the telco line was left on hold or there is an incoming telco call. Software checks if the POTS device is off hook (Block 1036) by monitoring loop current on which ever line is active (i.e. telco or cellular). Presence of loop current means that the POTS is off hook. If, while in the Telco Talk State, loop current goes away (for more than 700 mS) then the POTS device is considered to be On hook or Hung up. If a hang up occurs, software transfers control to the Telco Up state (Block 910—FIG. 9). While in the Telco Talk state, software monitors the digit input status from the POTS device. Digits are accepted either as DTMF signals or by pulse detection. Software checks for a sequence of **C to be the Cel Code (Block 1038). If the Cel Code is detected while in the Telco Talk state, then software puts telco line on hold, switches the relay to the cel line (Block 1040) and transfers control to the Cel Switch state (Block 1002—FIG. 14). A hook flash is detected by software as the absence of loop current for between 20 and 200 milli seconds. If a hook flash is detected while in the Telco Talk state (Block 1042), then software first puts telco line on hold, then, switches the relay to the cel line (Block 1040), and transfers control to the Cel Switch state (Block 1002—FIG. 14). While in the Telco Talk state, the TRU is monitored to see if a Cel Alert message is received. If a Cel Alert is received (Block 1044), software initiates a call wait beep every 10 seconds while the Telco Talk state is active (Block 1046).

Figure 17:
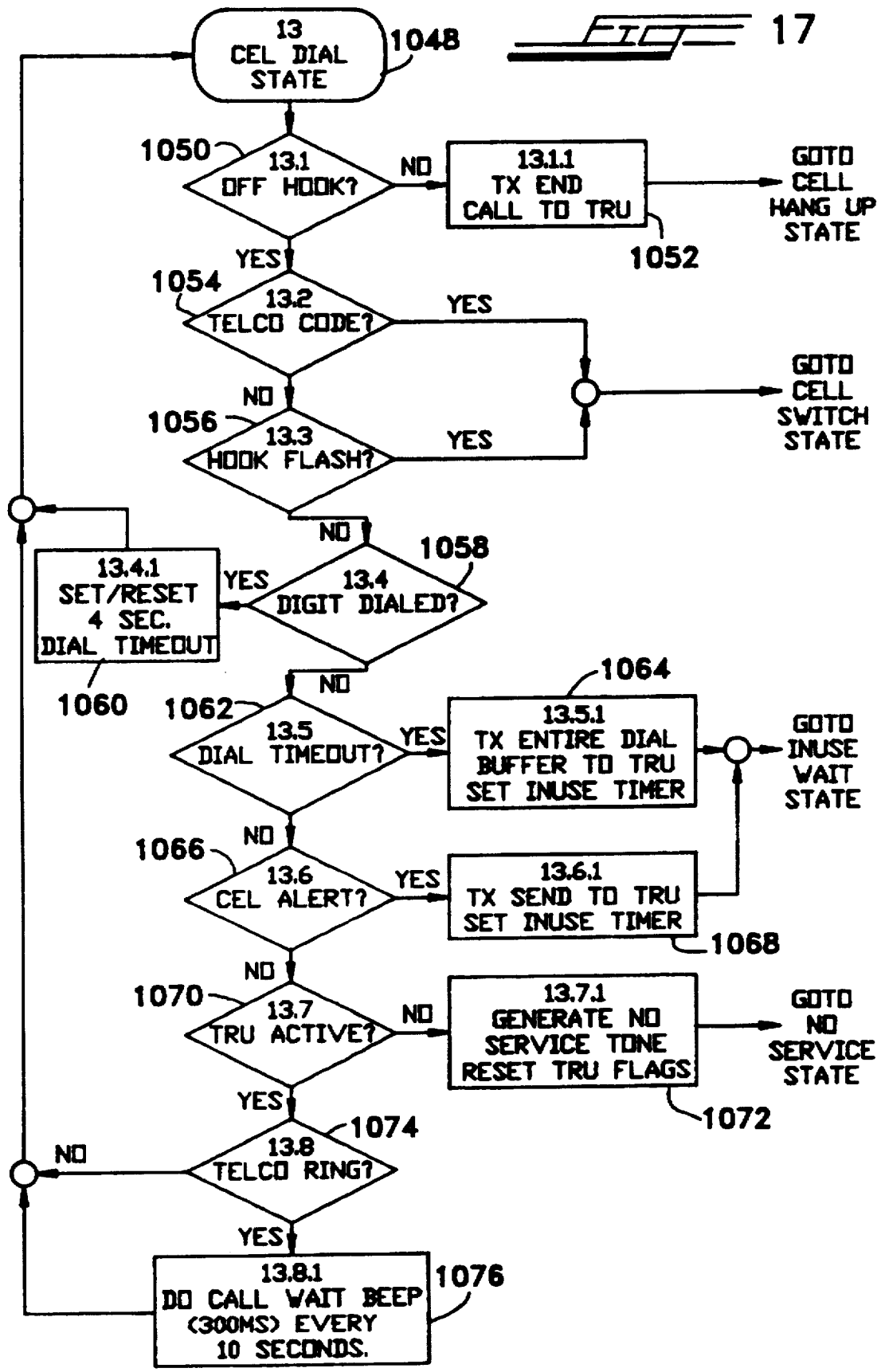
Figure 18:
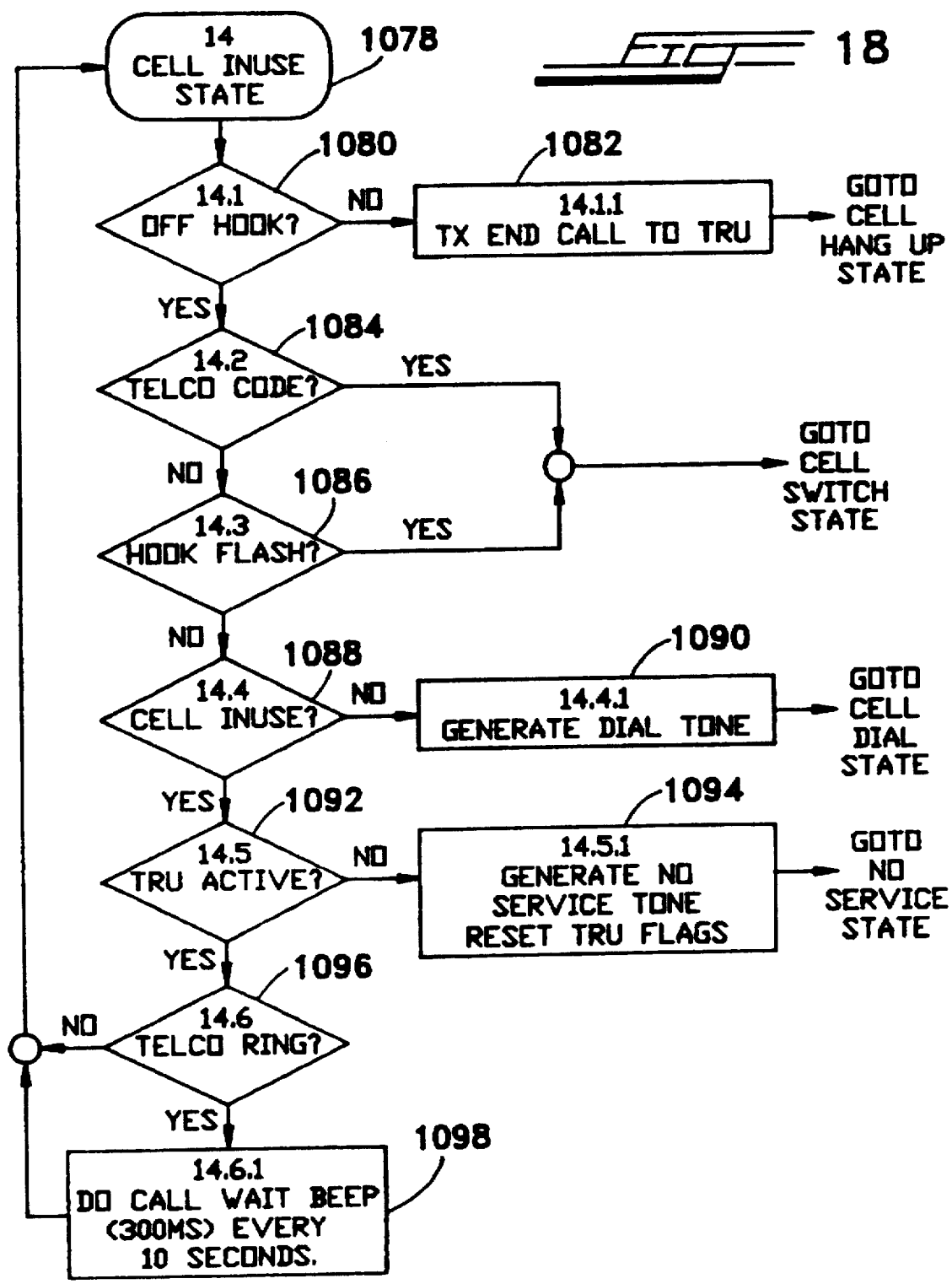

Referring now to FIG. 17, The Cel Dial state (Block 1048) becomes the active software loop any time a switch to the cellular line is made with the POTS device off hook and the TRU is NOT in use and there is NOT an incoming cel alert, but the TRU is active. Software checks if the POTS device is off hook (Block 1050) by monitoring loop current on which every line is active (i.e. telco or cellular). Presence of loop current means that the POTS is off hook. If, while in the Cel Dial state, loop current goes away (for more than 700 mS) then the POTS device is considered to be On hook or hung up. If a hang up occurs, software transmits an END CALL to the TRU (Block 1052) and transfers control to the Cel Hang Up state (Block 918—FIG. 9). While in the Cel Dial state, software monitors the digit input status from the POTS device. Digits are accepted either as DTMF signals or by pulse detection. Software checks for a sequence of **T to be the Telco Code. If the Telco code is detected while in the Cel Dial state (Block 1054), then software transfers control to the Telco Switch state (Block 992, FIG. 14). A hook flash is detected (Block 1056) by software as the absence of loop current for between 20 and 200 milli seconds. If a hook flash is detected while in the Cel Dial state, then software transfers control tot he Telco Switch state (Block 992, FIG., 14). While in the Cel Dial state, software monitors the digit input status from the POTS device. Digits are accepted either as DTMF signals of by pulse detection. Each time a digit is detected (Block 1058)

by software a dial timer is reset to four seconds (Block 1060). Also, digits are stored in a digit buffer. If the four second timer set from the digit detection times out (Block 1062), software assumes that the user has finished dialing. In this case, software sends the entire digit buff followed by the SEND command to the TRU (Block 1064), and control is transferred to the Cel Inuse Wait state and an Inuse timer is set (FIG. 19). If the alert message is detected from the TRU while in the Cel Dial state (Block 1066), software transmits the SEND command to the TRU (Block 1068), and control is transferred to the Cel Inuse Wait state (FIG. 19). While in the Cel Dial state, the TRU is monitored for activity (Block 1070). TRU may become inactive from being turned off, or unplugged. If the TRU is seen to go inactive while in the Cel Dial state, all TRU flagging is reset, a no service tone is generated (Block 1072), and control flow is transferred to the No Service state (FIG. 19). While in the Cel Dial state, POTS device is monitored to see if an incoming call exists. If an incoming call is detected (Block 1074), software initiates a call wait beep every 10 seconds while the Cel Dial state is active (Block 1076).

Referring now to FIG. 18, the Cel Inuse state (Block 1078) becomes the active software loop any time the POTS device is off hook and the TRU is in use. Software checks if the POTS device is off hook (Block 1080) by monitoring loop current on which every line is active (i.e. telco or cellular). Presence of loop current means that the POTS is off hook. If, while in the Cel Inuse state, loop current goes away (for more than 700 mS) then the POTS device is considered to be on hook or hung up. If a hang up occurs, software transmits an END CALL to the TRU (Block 1082) and transfers control to the Cel Hang Up state (Block 900). While in the Cel Inuse state, software monitors the digit input status from the POTS device. Digits are accepted either as DTMF signals or by pulse detection. Software checks for a sequence of **T to be the Telco code. If the Telco Code is detected (Block 1084) while in the Cel Inuse state, then software transfers control to the Telco Switch state (Block 992, FIG. 14). A hook flash is detected by software as the absence of loop current for between 20 and 200 milli seconds. If a hook flash is detected (Block 1086) while in the Cel Inuse state, then software transfers control to the Telco Switch state (Block 992, FIG. 14). If a Cel NOT Inuse message is received (Block 1088) from the TRU while in the Cel Inuse state, then software generates a dial tone (Block 1090), and control is transferred back to the Cel Dial State (Block 1048, FIG. 17). While in the Cel Inuse state, the TRU is monitored for activity. TRU may become inactive from being turned off, or unplugged. If the TRU is seen to go inactive while in the Cel Inuse state (Block 1092), all TRU flagging is reset, a no service tone is generated (Block 1094) and control flow is transferred to the No Service state (FIG. 19). While in the Cel Inuse state, POTS device is monitored to see if an incoming telco call exists (Block 1096). If an incoming telco call is detect software initiates a call wait beep every 10 seconds while the Cel Inuse state is active (Block 1098).

Referring now to FIG. 19, the Cel Inuse state (Block 1100) becomes the active software loop any time a SEND command is transmitted to the TRU. The purpose is to wait for the TRU to come Inuse. If a Cel Inuse message is received from the TRU while in the Cel Inuse Wait state (Block 1102), control is transferred to the Cel Inuse state (Block 1078, FIG. 18). While in the Cel Inuse Wait state, the TRU is monitored for activity. TRU may become inactive from being turned off, or unplugged. If the TRU is seen to go inactive while in the Cel Inuse Wait state (Block 1104), all TRU flagging is reset, a no service tone is generated (Block 1106), and control flow is transferred to the No Service state (Block 1048, FIG. 17). If a Cel Inuse message is NOT received within the time-out period (Block 1108), then dial tone is generated (Block 110), and control is transferred back to the Cel Dial state (Block 1078, FIG. 18).

The No Service state (Block 1112) becomes the active software loop any time the cellular line is active, the POTS is off hook, but there is no TRU activity. In this case, a no service tone is generated and the user may switch to the telco line or hang up. Software checks if the POTS device is off hook (Block 1114) by monitoring loop current on which ever line is active (i.e. telco or cellular). Presence of loop current means that the POTS is off hook. If, while in the no Service State, loop current goes away (for more than 700 mS) then the POTS device is considered to be On hook or hung up. If a hang up occurs, software transfers control to the Cel Hang Up state (Block 918, FIG. 3). While in the Cel Inuse Wait state, the TRU is monitored for activity (Block 1116). The fact that it is in this state means the TRU is seen to be inactive. However, the TRU may become active. If this occurs, control is transferred to the Cel Switch state. While in the No Service state, software monitors the digit input status from the POTS device. Digits are accepted either as DTMF signals or by pulse detection. Software checks for a sequence of **T to be the Telco Code. If the Telco Code is detected (Block 1118) while in the No Service state, then software transfers control to the Telco Switch state (Block 992, FIG. 14). A hook flash is detected by software as the absence of loop current for between 20 and 200 milli seconds. If a hook flash is detected (Block 1120) while in the No Service state, then software transfers control to the Telco Switch state (Block 992, FIG. 14).

While a detailed description of the preferred embodiment of the invention has been given above, it should be appreciated that many variations can be made thereto without departing from the spirit and scope of the invention as set forth in the appended claims. This invention is not limited for use in buildings have a four conductor internal telephone cable. The invention can be used in buildings having any greater number of conductors in its internal telephone cable, as long as one pair of conductors (or one internal communication channel) is not in use or can be freed from use. Furthermore, the disclosure assumes the internal telephone cable of the building is comprised of discrete metallic conductors, with a pair of conductors forming a communication path; however, it is foreseen that the internal telephone cable of the building can be coaxial, fiber optic, wireless or any other form of communication path. In addition, there is no requirement in this disclosure that there be a one-to-one correspondence between internal building telephone communication channels and conductors of a cable. It is foreseen that the invention also works with any type multiplexing of telephone channels on a single communication path.

What we claim is:

1. A telephone communications system for use at a fixed location, comprising:
   a first, land-line communication-link;
   a second, radio communication-link;
   at least one telephone, or telephone-like, instrument operatively associated with said first and second communication-links;
   means for alternately coupling said at least one telephone, or telephone-like, instrument to said first and second communication-links, whereby said at least one telephone, or telephone-like, instrument may be used over either of said communication-links;

said means for alternately coupling comprising a telephone-jack device having a first pair of tip-and-ring terminals operatively connected to said first, land-line communication-link, and a second pair of tip-and-ring terminals operatively connected to said second, radio communication-link, and switching means for switching the connection of said at least one telephone, or telephone-like, instrument between said communication-links.

2. The system according to claim 1, wherein said at least one telephone instrument is connected to said second pair of tip-and-ring terminals; said switching means alternatively connecting said second pair of tip-and-ring terminals to said first pair of tip-and-ring terminals for connecting said at least one telephone instrument to said land-line communication-link, and alternatively connecting said second pair of tip-and-ring terminals to said second, radio communication-link.

3. The system according to claim 1, wherein said second, radio communication-link is the cellular radio network.

4. The system according to claim 1, wherein said second, radio communication-link comprises a radio transceiver operatively coupled with second, radio communication-link, and interface means for interfacing said at least one telephone instrument to said radio transceiver; said interface means being operatively connected between said at least one telephone instrument and said transceiver.

5. The system according to claim 1, further comprising incoming-call detection means for detecting an incoming call on the respective one said communication-link that has been disconnected from said at least one telephone instrument by said means for alternately coupling; signal means for generating a signal to said at least one telephone instrument indicating that said means for detecting an incoming call has detected an incoming call; and actuating means for causing said means for alternately coupling to switch connection of said at least one telephone instrument from the other of said communication-link to said one communication-link in response to said means for detecting having detected an incoming call.

6. The system according to claim 1, comprising a plurality of telephone-jack devices at said local site, each of at least some of said telephone-jack device comprising a first pair of tip-and-ring terminals operatively connected to said first, land-line communication-link, and a second pair of tip-and-ring terminals operatively coupled to said second, radio communication-link; said switching means switching the connection between said communication-links for all of said plurality of telephone-jack devices, so that each of said plurality of telephone-jack devices may be alternately connected to said first, land-line communication-link, and alternately connected said to said second, radio communication-link.

7. The system according to claim 1, comprising a computer and associated memory means for said computer; and said memory means comprising actuating means for actuating said means for alternately coupling for switching the connection of said at least one telephone instrument.

8. The system according to claim 7, further comprising enabling means for enabling said actuating means actuating said switching means to switch connection; said enabling means comprising a manually-actuable enabler.

9. The system according to claim 8, wherein said manually-actuable enabler comprises a predetermined pattern of dialed digits input into said telephone instrument.

* * * * *